US009519200B2

(12) United States Patent
Kataoka et al.

(10) Patent No.: US 9,519,200 B2
(45) Date of Patent: Dec. 13, 2016

(54) OPTICAL CONTROL DEVICE

(71) Applicant: Sumitomo Osaka Cement Co., Ltd., Chiyoda-ku, Tokyo (JP)

(72) Inventors: Toshio Kataoka, Tokyo (JP); Masayuki Motoya, Tokyo (JP); Junichiro Ichikawa, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/780,526

(22) PCT Filed: Mar. 26, 2014

(86) PCT No.: PCT/JP2014/058581
§ 371 (c)(1),
(2) Date: Sep. 26, 2015

(87) PCT Pub. No.: WO2014/157361
PCT Pub. Date: Oct. 2, 2014

(65) Prior Publication Data
US 2016/0054637 A1  Feb. 25, 2016

(30) Foreign Application Priority Data
Mar. 26, 2013  (JP) .................................. 2013-064924

(51) Int. Cl.
*G02F 1/225* (2006.01)
*G02F 1/21* (2006.01)

(52) U.S. Cl.
CPC ....... *G02F 1/2255* (2013.01); *G02F 2001/212* (2013.01); *G02F 2201/122* (2013.01); *G02F 2201/127* (2013.01)

(58) Field of Classification Search
CPC .............. G02F 1/2255; G02F 2001/212; G02F 2201/122; G02F 2201/127
See application file for complete search history.

(56) References Cited

U.S. PATENT DOCUMENTS

2003/0219187 A1* 11/2003 Shimotsu ................ G02F 1/035
385/1
2003/0231369 A1* 12/2003 Sugiyama ............. G02F 1/0356
359/237

(Continued)

FOREIGN PATENT DOCUMENTS

JP  2004-020780 A  1/2004
JP  2004-157500 A  6/2004

(Continued)

OTHER PUBLICATIONS

International Search Report (PCT Article 18 and Rule 43 and 44), International Application No. PCT/JP2014/058581, Jun. 24, 2014.

(Continued)

*Primary Examiner* — Peter Radkowski
(74) *Attorney, Agent, or Firm* — Taft Stettinius & Hollister LLP

(57) ABSTRACT

Provided is an optical control device including first and second optical waveguides, a first control signal electrode including a first input-side signal electrode, a second control signal electrode including a second input-side signal electrode, an inter-signal-electrode ground electrode, a first ground electrode, and a second ground electrode. The substrate has a first groove that is provided between the first input-side signal electrode and the inter-signal-electrode ground, a second groove that is provided between the first input-side signal electrode and the first ground electrode, a third groove that is provided between the second input-side signal electrode and the inter-signal-electrode ground electrode, and a fourth groove that is provided between the second input-side signal electrode and the second ground electrode.

8 Claims, 14 Drawing Sheets

(56) References Cited

U.S. PATENT DOCUMENTS

| | | | |
|---|---|---|---|
| 2004/0066549 A1* | 4/2004 | Kiehne | G02F 1/0316 359/254 |
| 2006/0147145 A1* | 7/2006 | Shinriki | G02F 1/0305 385/3 |
| 2008/0193074 A1* | 8/2008 | Sugiyama | G02F 1/2255 385/8 |
| 2009/0154867 A1* | 6/2009 | Iwata | G02F 1/0356 385/2 |
| 2010/0067840 A1* | 3/2010 | Sugiyama | G02F 1/0316 385/2 |
| 2010/0202723 A1* | 8/2010 | Sugiyama | G02F 1/0316 385/2 |

FOREIGN PATENT DOCUMENTS

| | | | | |
|---|---|---|---|---|
| JP | 2004157500 | A | * | 6/2004 |
| JP | 2008-191614 | A | | 8/2008 |
| JP | 2008191614 | A | * | 8/2008 |
| JP | 2009-048087 | A | | 3/2009 |
| JP | 2009-053444 | A | | 3/2009 |
| JP | 2009048087 | A | * | 3/2009 |
| JP | 2009053444 | A | * | 3/2009 |
| JP | 2009-145816 | A | | 7/2009 |
| JP | 2009145816 | A | * | 7/2009 |
| JP | 2010-032690 | A | | 2/2010 |
| JP | 2010-072129 | A | | 4/2010 |
| JP | 2010072129 | A | * | 4/2010 |
| JP | 2010-185979 | A | | 8/2010 |
| JP | 2010185979 | A | * | 8/2010 |
| JP | 2010-237593 | A | | 10/2010 |
| JP | 2010237593 | A | * | 10/2010 |
| JP | 2011252942 | A | * | 12/2011 |
| JP | 2012-212028 | A | | 11/2012 |
| JP | 2012212028 | A | * | 11/2012 |

OTHER PUBLICATIONS

Notification of Transmittal of Copies of Translation of the International Preliminary Report on Patentability (Chapter I or Chapter II), International Application No. PCT/JP2014/058581, Oct. 8, 2015, with attachments.

Japan Patent Office, Notice of Allowance issue on May 31, 2016, in Japan Patent App. No. 2015-043763, Tokyo, Japan.

* cited by examiner

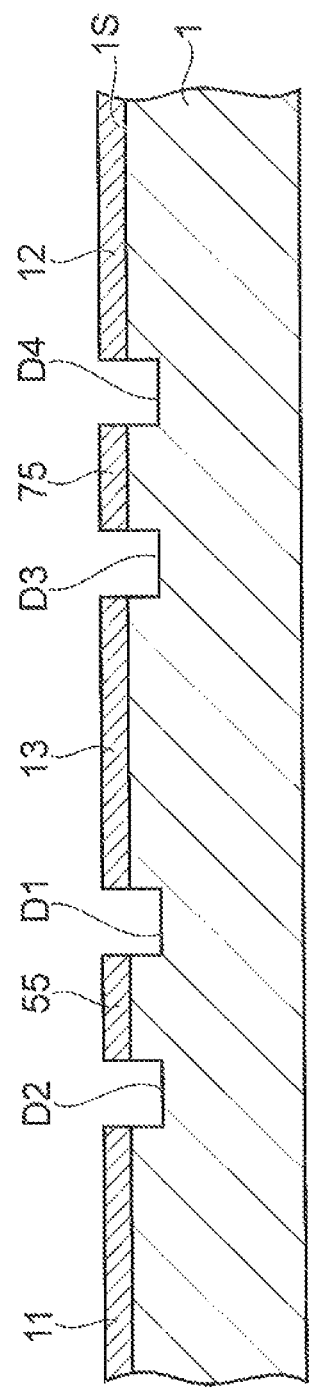
Fig. 3
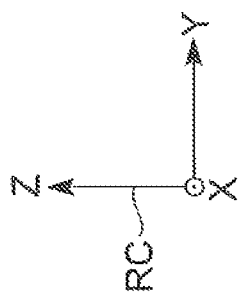

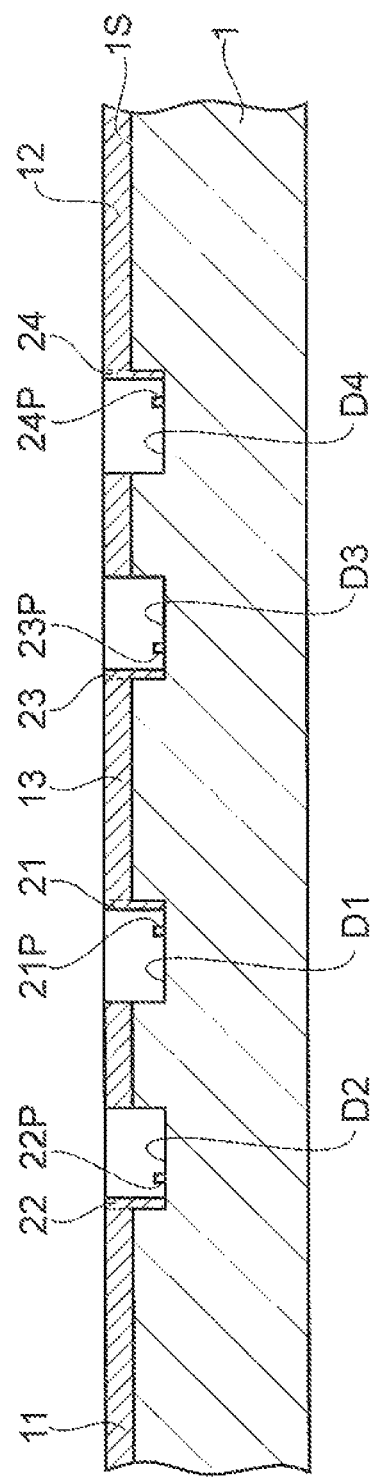
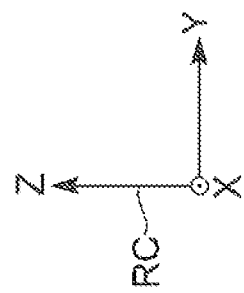
Fig. 12

OPTICAL CONTROL DEVICE

TECHNICAL FIELD

The present invention relates to an optical control device.

BACKGROUND ART

In Patent Literature No. 1, an optical waveguide element that is applicable to an optical modulator and the like is described. The optical waveguide element that is described in Patent Literature No. 1 includes plural optical waveguide parts which are arranged on a substrate in proximity to each other and in parallel with each other, and plural modulation electrodes which apply an electrical field based on an independent modulation signal (control signal) to each of the optical waveguide parts.

CITATION LIST

Patent Literature

Patent Literature No. 1: Japanese Patent Application Laid-Open Publication No. 2009-53444
Patent Literature No. 2: Japanese Patent Application Laid-Open Publication No. 2010-237593

SUMMARY OF INVENTION

Technical Problem

In an optical control device such as an optical modulator including plural optical waveguide parts which are disposed on a substrate in proximity to each other and in parallel with each other, and plural modulation electrodes which apply an independent modulation signal to each of the optical waveguide parts, the plural optical waveguide parts are in proximity to each other, and thus a spaced distance between parts (operating electrode parts), which apply an electrical field to the plural optical waveguide parts, among the plural modulation electrodes becomes short. Therefore, cross-talk (a phenomenon in which a part of modulation signals propagating through the inside of the operating electrode part on one side moves to a modulation signal propagating through the inside of the operating electrode part on the other side) between the operating electrode parts among the plural modulation electrodes becomes a problem.

In the optical waveguide element described in Patent Literature No. 1, a groove is formed in a region between the operating electrode parts on a main surface of the substrate so as to suppress the cross-talk between the operating electrode parts among the plural modulation electrodes.

Typically, in the optical control device provided with the plural modulation electrodes, each of the modulation electrodes includes the above-described operating electrode part, and an input-side signal electrode that transmits a modulation signal, which is input from an outer side, to the operating electrode part. In addition, typically, among the plural modulation electrodes, it is easy for a spaced distance between input-side signal electrodes to be larger than a spaced distance between the respective operating electrode parts. Accordingly, the cross-talk (a phenomenon in which a part of modulation signals propagating through the inside of an arbitrary modulation electrode moves to a modulation signal propagating through the inside of another modulation electrode) between the respective modulation electrodes is recognized to those skilled in the art as a phenomenon that occurs between the respective operating electrode parts spaced away from each other at a short distance. In addition, for example, as is the case with the method described in Patent Literature No 1, various methods of suppressing the cross-talk between the respective operating electrode parts are suggested.

However, the present inventors have obtained the following finding. The cross-talk between the respective modulation electrodes also becomes a problem between respective input-side signal electrodes which are spaced away from each other at a distance greater than the spaced distance between the respective operating electrode parts. Patent Literature No. 1 does not describe the occurrence of the cross-talk between the respective input-side signal electrodes (cross-talk between the respective input-side signal electrodes, that is, a phenomenon in which a part of modulation signals propagating through the inside of an arbitrary input-side signal electrode moves to a modulation signal propagating through the inside of another input-side signal electrode), or a method of suppressing the cross-talk between the respective input-side signal electrodes. Patent Literature No. 2 discloses a method of suppressing cross-talk between input-side signal electrodes having a bent part obtained by folding back a wiring. However, in the method, it is necessary to make the thickness of a substrate, which is used in an optical modulator, be as small as 30 µm to 100 µm.

In addition, in a case of an integrated optical control device including plural control signal electrodes, a signal delay circuit or an impedance converting circuit is typically introduced to the input-side signal electrode. In this device, it is necessary to make the length of respective input-side signal electrodes longer, and each of the input-side signal electrodes includes a structure changing part such as a bent part, a meandering part, a signal electrode width changing part, and a signal electrode-ground electrode distance changing part in many cases. Therefore, according to a finding obtained by the present inventors, in the device, propagation of a control signal (modulation signal) is unstable, and thus cross-talk of a control signal between the respective input-side signal electrodes is particularly likely to occur.

The invention has been made in consideration of the above-described problem, and an object thereof is to provide an optical control device which includes plural modulation electrodes and in which cross-talk between respective input-side signal electrodes of respective modulation electrodes is suppressed even without reducing the thickness of a substrate.

Solution to Problem

To solve the above-described problem, according to an aspect of the invention, there is provided an optical control device including: a substrate; first and second optical waveguides which are provided on the substrate, and extend along a main surface of the substrate; a first control signal electrode which is provided on the main surface of the substrate so as to change a refractive index of light propagating through the inside of the first optical waveguide on the basis of a first electrical signal that is supplied from an outer side, and which includes a first operating electrode part that extends along the first optical waveguide to apply an electrical field to the first optical waveguide, and a first input-side signal electrode that extends along the main surface of the substrate to transmit the first electrical signal to the first operating electrode part; a second control signal electrode which is provided on the main surface of the substrate so as to change a refractive index of light propagating through the inside of the second optical waveguide on the basis of a second electrical signal that is supplied from an outer side, and which includes a second operating electrode part that extends along the second optical waveguide to apply an electrical field to the second optical waveguide, and a second input-side signal electrode that extends along the main surface of the substrate to transmit the second electrical signal to the second operating electrode part; an inter-signal-electrode ground electrode which is provided on the main surface of the substrate between the first input-side signal electrode and the second input-side signal electrode, and which is positioned to be spaced away from the first input-side signal electrode and the second input-side signal electrode in a plan view; a first ground electrode which is provided on the main surface of the substrate on a side opposite to an inter-signal-electrode ground electrode side with the first input-side signal electrode interposed between the first ground electrode and the inter-signal-electrode ground electrode, and which is positioned to be spaced away from the first input-side signal electrode in a plan view; and a second ground electrode which is provided on the main surface of the substrate on a side opposite to an inter-signal-electrode ground electrode side with the second input-side signal electrode interposed between the second ground electrode and the inter-signal-electrode ground electrode, and which is positioned to be spaced away from the second input-side signal electrode in a plan view. In a plan view, the substrate includes a first groove that is provided between the first input-side signal electrode and the inter-signal-electrode ground electrode, a second groove that is provided between the first input-side signal electrode and the first ground electrode, a third groove that is provided between the second input-side signal electrode and the inter-signal-electrode ground electrode, and a fourth groove that is provided between the second input-side signal electrode and the second ground electrode.

In the optical control device according to the aspect of the invention, since the substrate has the first groove and the second groove, it is possible to further reduce a spaced distance between one end of the first ground electrode and one end of the inter-signal-electrode ground electrode along a first direction in comparison to a case where the substrate does not have these grooves. In a case where the spaced distance is small, it is also possible to reduce a spaced distance between the first input-side signal electrode and the first ground electrode and a spaced distance between the first input-side signal electrode and the inter-signal-electrode ground electrode. According to this, it is possible to reduce spreading of lines of electric force between the first input-side signal electrode and the first ground electrode and between the first input-side signal electrode and the inter-signal-electrode ground electrode, and thus it is possible to more effectively terminate the lines of electric force which extend from the first input-side signal electrode to the first ground electrode and the inter-signal-electrode ground electrode. That is, even though the spaced distance between the first input-side signal electrode and the second input-side signal electrode is not large, when the substrate has the first groove and the second groove, the lines of electric force which occur from the first input-side signal electrode are more effectively terminated. Accordingly, even though the thickness of the substrate is not made to be small, it is possible to reduce cross-talk of a control signal propagating through the inside of the first input-side signal electrode to a control signal propagating through the inside of the second input-side signal electrode.

Similarly, since the substrate has the third groove and the fourth groove, it is possible to further reduce a spaced distance between one end of the second ground electrode and one end of the inter-signal-electrode ground electrode along the first direction in comparison to a case where the substrate does not have these grooves. In a case where the spaced distance is small, it is also possible to reduce a spaced distance between the second input-side signal electrode and the second ground electrode and a spaced distance between the second input-side signal electrode and the inter-signal-electrode ground electrode. According to this, it is possible to reduce spreading of lines of electric force between the second input-side signal electrode and the second ground electrode and between the second input-side signal electrode and the inter-signal-electrode ground electrode, and thus it is possible to more effectively terminate the lines of electric force which extend from the second input-side signal electrode to the second ground electrode and the inter-signal-electrode ground electrode. That is, even though the spaced distance between the first input-side signal electrode and the second input-side signal electrode is not large, when the substrate has the third groove and the fourth groove, the lines of electric force which occur from the second input-side signal electrode are more effectively terminated. Accordingly, even though the thickness of the substrate is not made to be small, it is possible to reduce cross-talk between a control signal propagating through the inside of the second input-side signal electrode and a control signal propagating through the inside of the first input-side signal electrode. As a result, according to the optical control device relating to the first aspect, it is possible to suppress cross-talk between the first input-side signal electrode and the second input-side signal electrode.

In addition, in the optical control device according to the aspect of the invention, the depth of the first groove, the second groove, the third groove, and the fourth groove may be set to 2 μm or more. According to this, it is possible to particularly suppress the cross-talk between the first input-side signal electrode and the second input-side signal electrode.

In addition, in the optical control device according to the aspect of the invention, the inter-signal-electrode ground electrode may include a main part, and a first small-thickness part which is provided on a first groove side in comparison to the main part and is thinner than the main part and/or a second small-thickness part which is provided on a third groove side in comparison to the main part and is thinner than the main part, and/or the first ground electrode may include a main part, and a small-thickness part which is provided on a second groove side in comparison to the main part and is thinner than the main part and/or the second ground electrode may include a main part, and a small-thickness part which is provided on a fourth groove side in comparison to the main part and is thinner than the main part.

In this case, the inter-signal-electrode ground electrode has a step difference between the main part and the first small-thickness part, and/or the first ground electrode has a step difference between the main part and the small-thickness part. Accordingly, a surface area of the inter-signal-electrode ground electrode and/or the first ground electrode, which face the first input-side signal electrode, increases. According to this, the lines of electric force which are radiated from the first input-side signal electrode are likely to terminate at the inter-signal-electrode ground electrode and/or the first ground electrode, and thus the lines of electric force are suppressed from reaching the second input-side signal electrode. Similarly, the inter-signal-electrode ground electrode has a step difference between the main part and the second small-thickness part, and/or the second ground electrode has a step difference between the main part and the small-thickness part. Accordingly, a surface area of the inter-signal-electrode ground electrode and/or the second ground electrode, which face the second input-side signal electrode, increases. According to this, the lines of electric force which are radiated from the second input-side signal electrode are likely to terminate at the inter-signal-electrode ground electrode and/or the second ground electrode, and thus the lines of electric force are suppressed from reaching the first input-side signal electrode. As a result, it is possible to further suppress the cross-talk between the first input-side signal electrode and the second input-side signal electrode.

In addition, in the optical control device according to the aspect of the invention, the first control signal electrode may include a main part, and a first small-thickness part which is provided on a first groove side in comparison to the main part and is thinner than the main part and/or a second small-thickness part which is provided on a second groove side in comparison to the main part and is thinner than the main part, and/or the second control signal electrode may include a main part, and a first small-thickness part which is provided on a third groove side in comparison to the main part and is thinner than the main part and/or a second small-thickness part which is provided on a fourth groove side in comparison to the main part and is thinner than the main part.

In this case, when the first electrical signal is applied to the first input-side signal electrode of the first control signal electrode from an outer side, an electric field is concentrated to the first small-thickness part and/or the second small-thickness part which have a small thickness, and thus lines of electric force are radiated mainly from the first small-thickness part and/or the second small-thickness part. In addition, the first small-thickness part and/or the second small-thickness part of the first input-side signal electrode emit the lines of electric force from a position that is lower and closer to the substrate in comparison to the main part, and thus the lines of electric force which are radiated from these small-thickness parts are suppressed from reaching the second input-side signal electrode through an upper side of the main surface of the substrate. Similarly, when the second electrical signal is applied to the second input-side signal electrode of the second control signal electrode from an outer side, an electric field is concentrated to the first small-thickness part and/or the second small-thickness part which have a small thickness, and thus lines of electric force are radiated mainly from the first small-thickness part and/or the second small-thickness part. In addition, the first small-thickness part and/or the second small-thickness part of the second input-side signal electrode emit the lines of electric force from a position that is lower and closer to the substrate in comparison to the main part, and thus the lines of electric force which are radiated from these small-thickness parts are suppressed from reaching the first input-side signal electrode through an upper side of the main surface of the substrate. As a result, it is possible to further suppress the cross-talk between the first input-side signal electrode and the second input-side signal electrode.

In addition, in the optical control device according to the aspect of the invention, at least one of the inter-signal-electrode ground electrode, the first ground electrode, and the second ground electrode may have a through-hole. According to this, a surface area of at least one of the inter-signal-electrode ground electrode, the first ground electrode, and the second ground electrode increases, and thus the lines of electric force, which are radiated from the first input-side signal electrode, are likely to terminate at the inter-signal-electrode ground electrode and the first ground electrode, and the lines of electric force, which are radiated from the second input-side signal electrode, are likely to terminate at the inter-signal-electrode ground electrode and the second ground electrode. As a result, it is possible to further suppress the cross-talk between the first input-side signal electrode and the second input-side signal electrode.

In addition, the optical control device according to the aspect may further include an in-first-groove ground electrode which is provided in the first groove and is electrically connected to the inter-signal-electrode ground electrode, and/or an in-second-groove ground electrode which is provided in the second groove and is electrically connected to the first ground electrode, and/or an in-third-groove ground electrode which is provided in the third groove and is electrically connected to the inter-signal-electrode ground electrode, and/or an in-fourth-groove ground electrode which is provided in the fourth groove and is electrically connected to the second ground electrode.

In this case, a part of the lines of electric force which are radiated from the first input-side signal electrode terminate at the in-first-grove ground electrode and/or the in-second-groove ground electrode, and/or a part of the lines of electric force which are radiated from the second input-side signal electrode terminate at the in-third-groove ground electrode and/or the in-fourth-groove ground electrode. As a result, the lines of electric force which are radiated from the first input-side signal electrode, and the lines of electric force which are radiated from the second input-side signal electrode are likely to terminate at a closer position. Accordingly, it is possible to further suppress the cross-talk between the first input-side signal electrode and the second input-side signal electrode.

In addition, in the optical control device according to the aspect of the invention, at least one of the in-first-groove ground electrode, the in-second-groove ground electrode, the in-third-groove ground electrode, and the in-fourth-groove ground electrode may have a through-hole. According to this, the surface area of the in-first-groove ground electrode, the in-second-groove ground electrode, the in-third-groove ground electrode, and the in-fourth-groove ground electrode increases. Accordingly, the lines of electric force, which are radiated from the first input-side signal electrode, are likely to terminate at the in-first-groove ground electrode and the in-second-groove ground electrode, and the lines of electric force, which are radiated from the second input-side signal electrode, are likely to terminate at the in-third-groove ground electrode and the in-fourth-groove ground electrode. As a result, it is possible to further suppress the cross-talk between the first input-side signal electrode and the second input-side signal electrode.

In addition, in the optical control device according to the aspect of the invention, each of the inter-signal-electrode ground electrode, the first ground electrode, and the second ground electrode may have a concave portion. According to this, the surface area of the inter-signal-electrode ground electrode, the first ground electrode, and the second ground electrode increases. Accordingly, the lines of electric force, which are radiated from the first input-side signal electrode, are likely to terminate at the inter-signal-electrode ground electrode and the first ground electrode, and the lines of electric force, which are radiated from the second input-side signal electrode, are likely to terminate at the inter-signalelectrode ground electrode and the second ground electrode. As a result, it is possible to further suppress the cross-talk between the first input-side signal electrode and the second input-side signal electrode.

In addition, in the optical control device according to the aspect of the invention, one end of the first ground electrode, one end of the first input-side signal electrode, one end of the inter-signal-electrode ground electrode, one end of the second input-side signal electrode, and one end of the second ground electrode may be arranged along a first direction along the main surface of the substrate in this order. When a spaced distance between the one end of the first input-side signal electrode and the one end of the second input-side signal electrode along the first direction is set as D, and a spaced distance between the one end of the first ground electrode and the one end of the inter-signal-electrode ground electrode along the first direction, or a spaced distance between the one end of the second ground electrode and the one end of the inter-signal-electrode ground electrode along the first direction is set as K, a value of D/K may be 3.0 or less. It is apparent that as the value of D is larger, it is advantageous for prevention of the cross-talk. However, the present inventors have obtained the following findings. In a case where the value of K is large, cross-talk characteristics are likely to deteriorate, and the value of D/K is effective as a discriminant of the cross-talk characteristics. In addition, in an optical control device of the related art in which the value of D/K is set to satisfy the condition, the cross-talk is particularly likely to occur between an element corresponding to the first input-side signal electrode and an element corresponding to the second input-side signal electrode. Accordingly, when the aspect of the invention is applied to the optical control device in such a manner that the value of D/K satisfies the condition, the above-described effect of the aspect of the invention is exhibited in a particularly effective manner.

Advantageous Effects of Invention

According to the invention, as an optical control device including plural modulation electrodes, an optical control device, in which cross-talk between respective input-side signal electrodes of respective modulation electrodes is suppressed, is provided.

BRIEF DESCRIPTION OF DRAWINGS

FIG. 3 is an end view of the optical control device which is taken along line in FIG. 2.

FIG. 12 is an end view of an optical control device which is taken along line XII-XII in FIG. 11.

DESCRIPTION OF EMBODIMENTS

Figure 1:
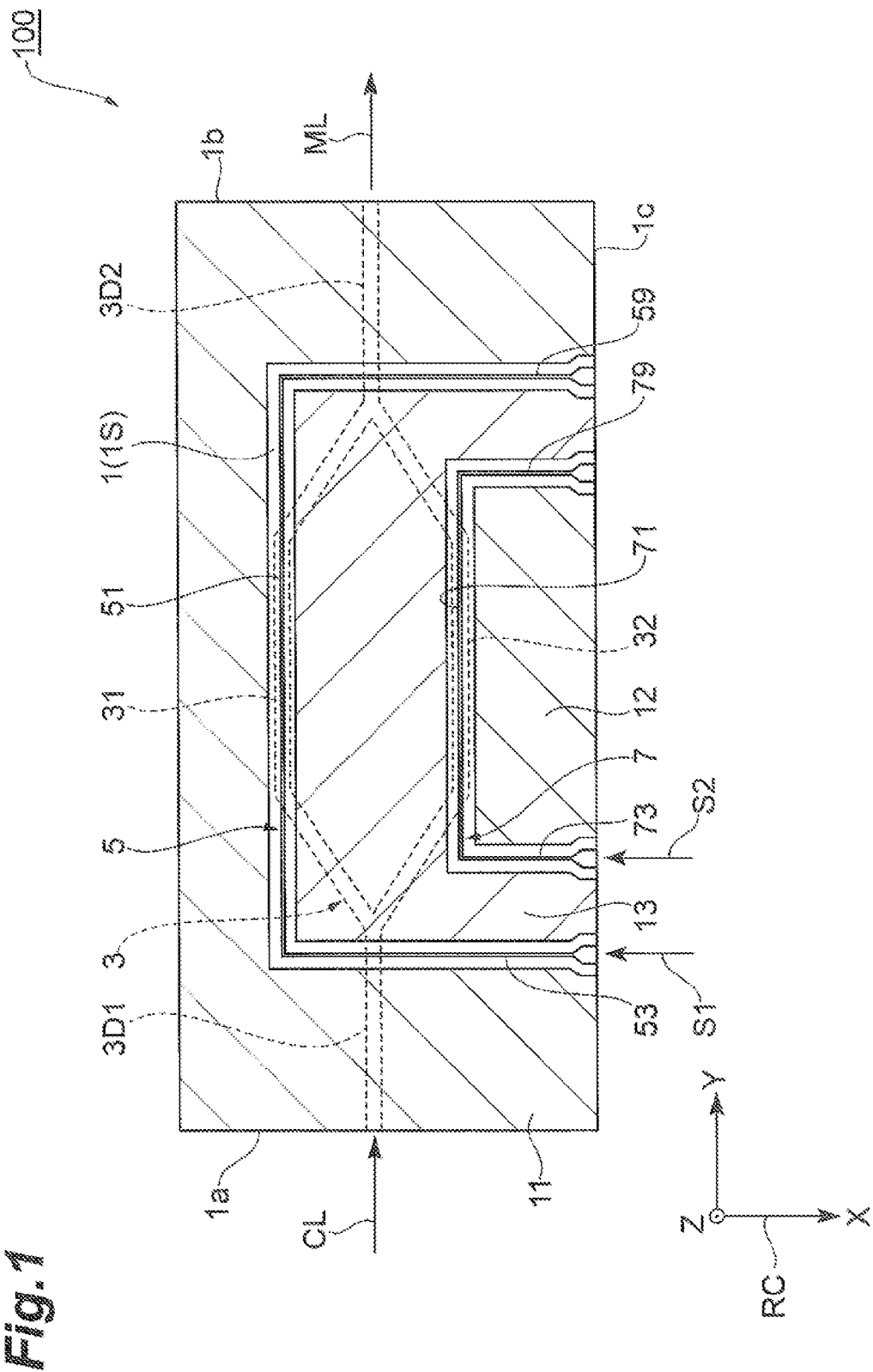
FIG. 1 is a plan view illustrating a configuration of an optical control device according to a first embodiment.

Hereinafter, optical control devices according to embodiments will be described in detail with reference to the accompanying drawings. In addition, in the respective drawings, the same reference numeral is given to the same element when possible. In addition, constituent elements and a dimensional ratio between the constituent elements in the drawings are arbitrarily set for visibility of the drawings.

First Embodiment

FIG. 1 is a plan view illustrating a configuration of an optical control device according to a first embodiment. As illustrated in FIG. 1, an optical control device 100 of this embodiment is a device that controls (for example, modulates) input light CL that is continuous light introduced by an optical fiber and the like, and outputs modulated light wave ML to an outer side. Examples of the optical control device 100 include a device such as an optical modulator, an optical switch, and a polarized wave controller which controls the input light CL. For example, in a case where the optical control device 100 is the optical modulator, the optical control device 100 outputs the modulated light wave ML that is modulated on the basis of an electrical signal supplied from an outer side.

The optical control device 100 may include a substrate 1, an optical waveguide structure 3 that is provided on the substrate 1, a first control signal electrode 5, a second control signal electrode 7, a first ground electrode 11, a second ground electrode 12, and an inter-signal-electrode ground electrode 13. In addition, in FIG. 1, the optical waveguide structure 3 is indicated by a broken line, and the first ground electrode 11, the second ground electrode 12, and the inter-signal-electrode ground electrode 13 are indicated by a hatched line.

For example, the substrate 1 is a plate-shaped member that is made of a dielectric material such as lithium niobate (LiNbO$_3$) that exhibits an electro-optical effect. The substrate 1 has a rectangular shape that extends along a Y-axis direction (first direction). The substrate 1 has an approximately flat main surface 1S. FIG. 1 illustrates a rectangular coordinate system RC. In FIG. 1, a direction parallel with the main surface 1S is set as an X-axis and the Y-axis, and a direction perpendicular to the main surface 1S is set as a Z-axis. In the respective drawings after FIG. 2, the rectangular coordinate system RC is illustrated to correspond to FIG. 1 as necessary. In this embodiment, a shape of the main surface 1S of the substrate 1 in a plan view (when viewed from the Z-axis direction) is a rectangular shape having an outer edge along the X-axis and the Y-axis.

The optical waveguide structure 3 is provided on the substrate 1. The optical waveguide structure 3 is constituted by plural optical waveguides having a structure in accordance with an optical control type of the optical control device 100, and each of the plural optical waveguides extends along the main surface 1S of the substrate 1. For example, the optical waveguide structure 3 is made of a dielectric material such as lithium niobate (LiNbO$_3$) in which metal such as titanium (Ti) is diffused and exhibits an electro-optical effect. A refractive index of the material that constitutes the optical waveguide structure 3 is greater than a refractive index of a material that constitutes the substrate 1. Accordingly, the optical waveguide structure 3 functions as a core with respect to the substrate 1, and the substrate 1 functions as a clad with respect to the optical waveguide structure 3.

For example, a structure including the substrate 1 and the optical waveguide structure 3 provided on the substrate 1 can be obtained by preparing a plate-shaped initial substrate made of a dielectric material such as lithium niobate (LiNbO$_3$), and by diffusing a metal such as titanium (Ti) to a region of the initial substrate in which the optical waveguide structure 3 is to be formed so as to form a region having a refractive index higher than that of other regions of the substrate 1. Alternatively, the structure can be obtained by preparing the substrate 1, and by forming the optical waveguide structure 3 on the main surface 1S of the substrate 1.

In this embodiment, the optical waveguide structure 3 is constituted by a Mach-Zehnder type optical waveguide. Specifically, the optical waveguide structure 3 includes an input optical waveguide 3D1 that is a Y branch type optical waveguide, a first arm optical waveguide 31 as a first optical waveguide, a second arm optical waveguide 32 as a second optical waveguide, and an output optical waveguide 3D2 that is a Y coupling type optical waveguide. In this embodiment, the input optical waveguide 301, the first arm optical waveguide 31, the second arm optical waveguide 32, and the output optical waveguide 3D2 are disposed on the same substrate 1, thereby constituting the Mach-Zehnder type optical waveguide. However, for example, any one or both of the input optical waveguide 3D1 and the output optical waveguide 3D2 may be disposed on a substrate different from the substrate 1, and the one or both of these may be optically connected to the first arm optical waveguide 31 and the second arm optical waveguide 32 to construct the Mach-Zehnder type optical waveguide.

The input optical waveguide 3D 1 has a light input end provided at one end 1a of the substrate 1 in the Y-axis direction, extends from the light input end along the Y-axis direction, and is branched to be respectively connected to an input end of the first arm optical waveguide 31 and an input end of the second arm optical waveguide 32. The first arm optical waveguide 31 and the second arm optical waveguide 32 extend along the Y-axis direction that is a direction along the main surface 1S of the substrate 1. An output end of the first arm optical waveguide 31 and an output end of the second arm optical waveguide 32 are connected to two input ends of the output optical waveguide 3D2, respectively. The output optical waveguide 3D2 extends from the input ends along the Y-axis direction, and extends to a light output end that is positioned at the other end 1b of the substrate 1 in the Y-axis direction after coupling.

The first control signal electrode 5 is an electrode that is provided on the main surface 1S of the substrate 1 so as to change the refractive index of the first arm optical waveguide 31 on the basis of a first electrical signal S1 that is supplied from an outer side. The first control signal electrode 5 includes a first operating electrode part 51, a first input-side signal electrode 53, and a first output-side signal electrode 59.

The first operating electrode part 51 extends along the first arm optical waveguide 31, that is, along the Y-axis direction to apply an electrical field to the first arm optical waveguide 31. One end of the first input-side signal electrode 53 is positioned in the vicinity of one end 1c of the substrate 1 in the X-axis direction, and the first electrical signal S1 supplied from an outer side is input to the one end of the first input-side signal electrode 53.

The first input-side signal electrode 53 extends along the main surface 1S of the substrate 1 so that the first electrical signal S1 input to the one end of the first input-side signal electrode 53 propagates to one end of the first operating electrode 51 which is connected to the other end of the first input-side signal electrode 53. The other end of the first operating electrode part 51 is connected to one end of the first output-side signal electrode 59. The first output-side signal electrode 59 transmits the first electrical signal S1 propagating through the inside of the first operating electrode part 51 to the other end of the first output-side signal electrode 59. The other end of the first output-side signal electrode 59 is positioned in the vicinity of the one end 1c of the substrate 1. The other end of the first output-side signal electrode 59 may be electrically connected to a resistor having a termination end (not illustrated) that is an electrical termination end.

Similarly, the second control signal electrode 7 is an electrode that is provided on the main surface 1S of the substrate 1 so as to change the refractive index of the second arm optical waveguide 32 on the basis of a second electrical signal S2 that is supplied from an outer side. The second control signal electrode 7 includes a second operating electrode part 71, a second input-side signal electrode 73, and a second output-side signal electrode 79.

The second operating electrode part 71 extends along the second arm optical waveguide 32, that is, along the Y-axis direction to apply an electrical field to the second arm optical waveguide 32. One end of the second input-side signal electrode 73 is positioned in the vicinity of the one end 1c of the substrate 1 in the X direction, and the second electrical signal S2 supplied from an outer side is input to the one end of the second input-side signal electrode 73.

The second input-side signal electrode 73 extends along the main surface 1S of the substrate 1 so that the second electrical signal S2 input to the one end of the second input-side signal electrode 73 propagates to one end of the second operating electrode part 71 which is connected to the other end of the second input-side signal electrode 73. The other end of the second operating electrode part 71 is connected to one end of the second output-side signal electrode 79. The second output-side signal electrode 79 transmits the second electrical signal S2 propagating through the inside of the second operating electrode part 71 to the other end of the second output-side signal electrode 79. The other end of the second output-side signal electrode 79 is positioned in the vicinity of the one end 1c of the substrate 1. The other end of the second output-side signal electrode 79 may be electrically connected to a resistor having a termination end (not illustrated) that is an electrical termination end.

The input light CL is input from the light input end of the input optical waveguide 3D1, is branched by the input optical waveguide 301 into two parts, and propagates through the inside of the first arm optical waveguide 31 and the second arm optical waveguide 32. In addition, when the first electrical signal S1 is supplied to the first input-side signal electrode 53, the first operating electrode part 51 applies an electrical field corresponding to the first electrical signal S1 to the first arm optical waveguide 31, thereby changing the refractive index of the first arm optical waveguide 31 in accordance with the first electrical signal S1. According to this, the phase of the branched light of the input light CL, which is guided through the inside of the first arm optical waveguide 31, is changed. Similarly, when the second electrical signal S2 is supplied to the second input-side signal electrode 73, the second operating electrode part 71 applies an electrical field corresponding to the second electrical signal S2 to the second arm optical waveguide 32, thereby changing the refractive index of the second arm optical waveguide 32 in accordance with the second electrical signal S2. According to this, the phase of the branched light of the input light CL, which is guided through the inside of the second arm optical waveguide 32, is changed. Then, two branched light beams of which the phase is changed, are coupled in a predetermined aspect by an output optical waveguide 3D2, and are output from the output end of the output optical waveguide 302 to an outer side as control light ML. For example, in a case where the optical control device 100 is the optical modulator, the first electrical signal S1 and the second electrical signal S2 are modulation signals (control signals), and the control light ML becomes modulated light wave.

For example, each of the first control signal electrode 5 and the second control signal electrode 7 is made of a metal such as gold (Au). For example, in a case where the optical control device 100 is the optical modulator, each of the first electrical signal S1 and the second electrical signal S2 is a modulation signal including a high-frequency electrical signal of, for example, 10 GHz or higher.

Each of the first ground electrode 11, the second ground electrode 12, and the inter-signal-electrode ground electrode 13 is an electrode that is connected to a ground potential, and is made of, for example, a metal such as gold (Au). The first ground electrode 11, the second ground electrode 12, and the inter-signal-electrode ground electrode 13 are provided on the main surface 1S of the substrate 1, respectively. The first ground electrode 11, the second ground electrode 12, and the inter-signal-electrode ground electrode 13 are, for example, layered electrodes, and the thickness thereof may be set to, for example, 10 μm to 80 μm.

In a plan view, the inter-signal-electrode ground electrode 13 is positioned at least between the first input-side signal electrode 53 of the first control signal electrode 5 and the second input-side signal electrode 73 of the second control signal electrode 7 to be spaced away from the first input-side signal electrode 53 and the second input-side signal electrode 73. In this embodiment, in a plan view, the inter-signal-electrode ground electrode 13 is positioned between the entirety of the first control signal electrode 5 and the entirety of the second control signal electrode 7 to be spaced from the first control signal electrode 5 and the second control signal electrode 7.

In a plan view, the first ground electrode 11 is positioned on a side opposite to an inter-signal-electrode ground electrode 13 side with at least the first input-side signal electrode 53 of the first control signal electrode 5 interposed between the first ground electrode 11 and the inter-signal-electrode ground electrode 13, and is spaced away from the first input-side signal electrode 53. In this embodiment, in a plan view, the first ground electrode 11 is positioned on a side opposite to an inter-signal-electrode ground electrode 13 side of the entirety of the first control signal electrode 5, and is spaced away from the first control signal electrode 5.

In a plan view, the second ground electrode 12 is positioned on a side opposite to an inter-signal-electrode ground electrode 13 side with at least the second input-side signal electrode 73 of the second control signal electrode 7 interposed between the second ground electrode 12 and the second input-side signal electrode 73, and is spaced away from the second input-side signal electrode 73. In this embodiment, in a plan view, the second ground electrode 12 is positioned on a side opposite to an inter-signal-electrode ground electrode 13 side of the entirety of the second control signal electrode 7, and is spaced away from the second control signal electrode 7.

In addition, the first control signal electrode 5, the second control signal electrode 7, the first ground electrode 11, the second ground electrode 12, and the inter-signal-electrode ground electrode 13 may be provided so as to come into direct contact with the main surface 1S of the substrate 1, or may be provided on the main surface 1S of the substrate 1 through a buffer layer that is made of, for example, a dielectric material such as silicon oxide ($SiO_2$).

Figure 2:
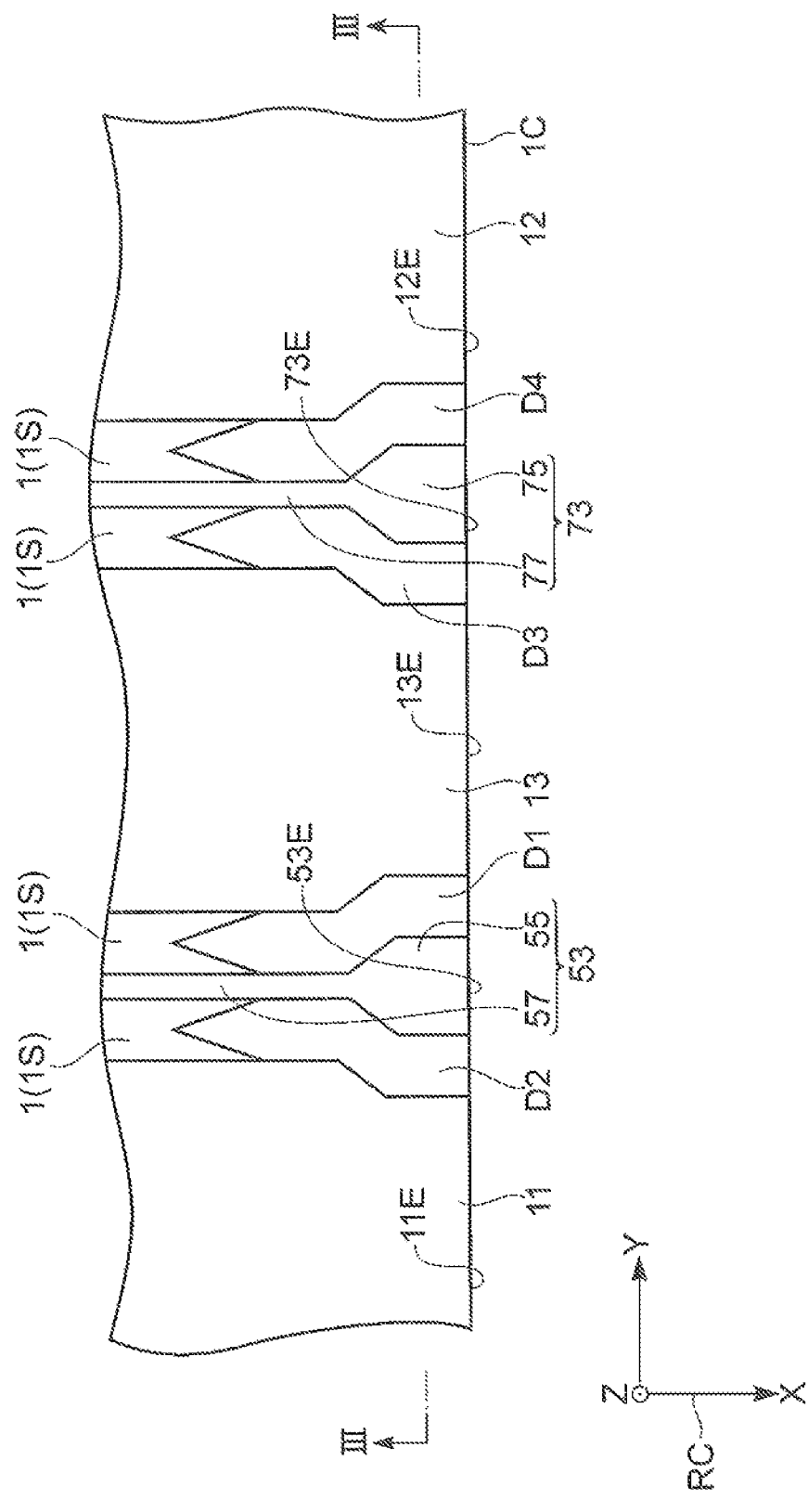
FIG. 2 is a plan view illustrating the configuration of a first input-side signal electrode of a first control signal electrode, and a first input-side signal electrode of a second control signal electrode of the optical control device illustrated in FIG. 1 in the vicinity of ends on one side.

FIG. 2 is a plan view illustrating a configuration of the first input-side signal electrode of the first control signal electrode, and the first input-side signal electrode of the second control signal electrode of the optical control device illustrated in FIG. 1 in the vicinity of ends on one side. FIG. 3 is an end view of the optical control device which is taken along line in FIG. 2, and FIG. 4 is a perspective view illustrating a configuration of the first input-side signal electrode and the first input-side signal electrode of the optical control device illustrated in FIG. 1 in the vicinity of ends on one side.

Figure 4:
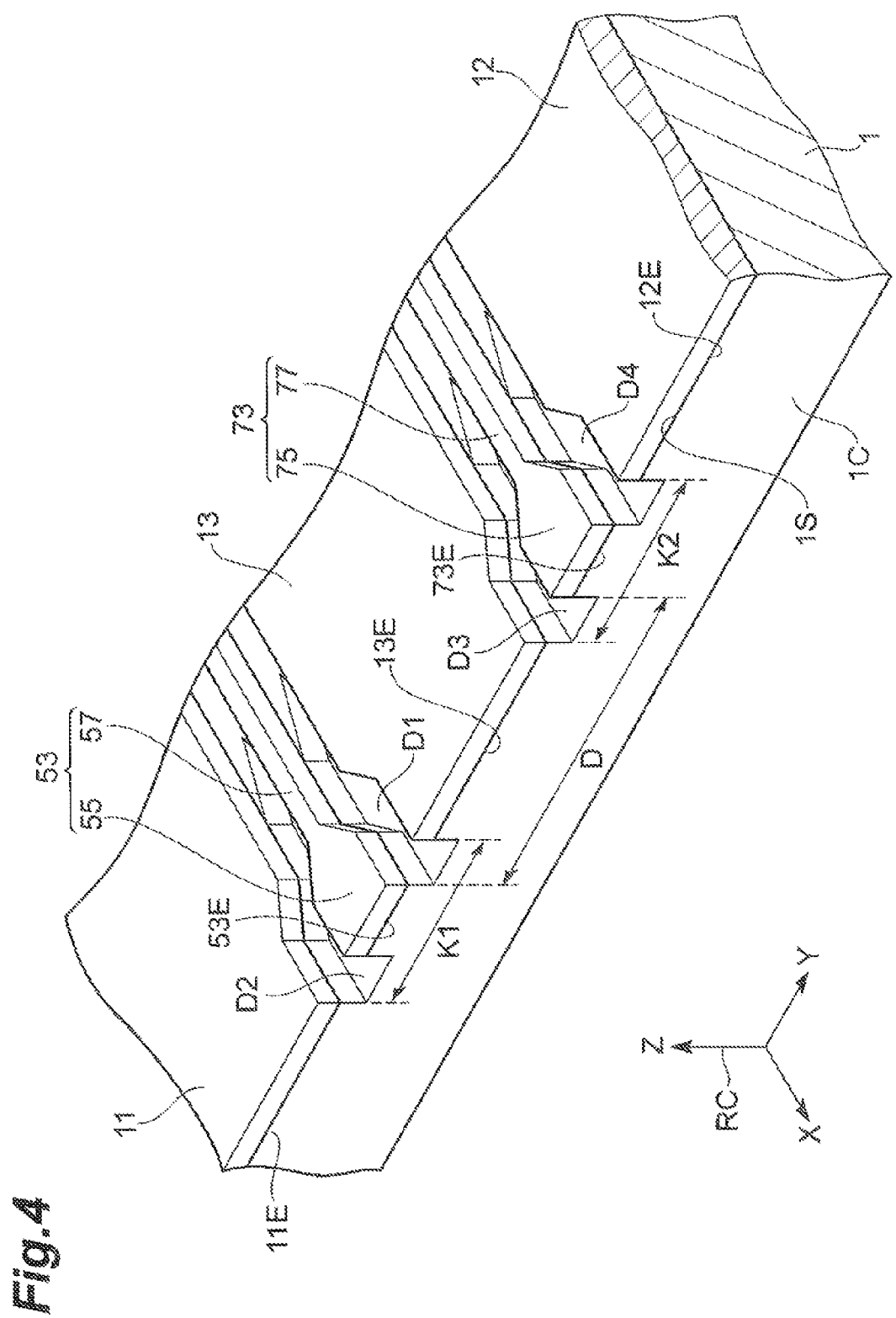
FIG. 4 is a perspective view illustrating a configuration of the first input-side signal electrode and the first input-side signal electrode of the optical control device illustrated in FIG. 1 in the vicinity of ends on one side.

As illustrated in FIG. 2 to FIG. 4, the first input-side signal electrode 53 of the first control signal electrode 5 includes an input pad 55 and a signal transmitting part 57. The input pad 55 is an element that constitutes one end 53E of the first input-side signal electrode 53, and functions as an electrical signal input part to which the first electrical signal S1 (refer to FIG. 1) is input. The signal transmitting part 57 transmits the first electrical signal S1, which is input to the input pad 55, to the first operating electrode part 51 (refer to FIG. 1). In a plan view, the first input-side signal electrode 53 extends along the main surface 1S of the substrate 1 with an approximately constant width, and extends along the X-axis direction in the vicinity of the one end 1c of the substrate 1. The width of the first input-side signal electrode 53 in a plan view can be suitably designed in consideration of continuity of characteristic impedance between the first operating electrode part 51 and the input pad 55, a signal delay time, and the like, and may be set to, for example, 5 μm to 50 μm. For example, the thickness of the first input-side signal electrode 53 may be set to 10 μm to 80 μm. The width and thickness of the input pad 55 may be set to be greater than the width and thickness of the signal transmitting part 57.

Similarly, the second input-side signal electrode 73 of the second control signal electrode 7 includes an input pad 75 and a signal transmitting part 77. The input pad 75 is an element that constitutes one end 73E of the second input-side signal electrode 73, and functions as an electrical signal input part to which the second electrical signal S2 (refer to FIG. 1) is input. The signal transmitting part 77 transmits the second electrical signal S2, which is input to the input pad 75, to the second operating electrode part 71 (refer to FIG. 1). In a plan view, the second input-side signal electrode 73 extends along the main surface 1S of the substrate 1 with an approximately constant width, and extends along the X-axis direction in the vicinity of the one end 1c of the substrate 1. The width of the second input-side signal electrode 73 in a plan view can be suitably designed in consideration of continuity of characteristic impedance between the second operating electrode part 71 and the input pad 75, a signal delay time, and the like, and may be set to, for example, 5 µm to 50 µm. For example, the thickness of the second input-side signal electrode 73 may be set to 10 µm to 80 µm. The width and thickness of the input pad 75 may be set to be greater than the width and thickness of the signal transmitting part 77.

In addition, in this embodiment, one end 11E of the first ground electrode 11, one end 53E of the first input-side signal electrode 53 of the first control signal electrode 5, one end 13E of the inter-signal-electrode ground electrode 13, one end 73E of the second input-side signal electrode 73 of the second control signal electrode 7, and one end 12E of the second ground electrode 12 are disposed in this order along a first direction (the Y-axis direction in this embodiment) along the main surface 1S of the substrate 1. In a plan view, the ends 11E, 53E, 13E, 73E, and 12E on one side may overlap the one end 1c of the substrate 1, or may be spaced away from the one end 1c of the substrate 1.

A spaced distance K1 between the one end 11E of the first ground electrode 11 and the one end 13E of the inter-signal-electrode ground electrode 13 along the first direction can be suitably designed in accordance with a method of connecting a connection member to the input pad 55, the width of the input pad 55 which is suitable for the connection member, the width and depth of a first groove D1 and a second groove D2 which are formed, the characteristic impedance of the first control signal electrode 5, and the like. In a case of designing the optical control device 100 as a circuit having an impedance of 50Ω by using the substrate 1 made of lithium niobate, for example, the spaced distance K1 may be set to 30 µm to 100 µm. Similarly, a spaced distance K2 between the one end 12E of the second ground electrode 12 and the one end 13E of the inter-signal-electrode ground electrode 13 along the first direction may be set to, for example, 30 µm to 100 µm.

As a spaced distance D between the one end 53E of the first input-side signal electrode 53 and the one end 73E of the second input-side signal electrode 73 along the first direction becomes smaller, cross-talk characteristics between the first input-side signal electrode 53 and the second input-side signal electrode 73 deteriorate. From this viewpoint, a value of D may be set to a magnitude of 5 or more times K1 and/or K2. However, according to the optical control device 100 of this embodiment, as described later, it is possible to suppress cross-talk between the first input-side signal electrode 53 and the second input-side signal electrode 73, and thus the value of the spaced distance D may be set to, for example, three or less times K1 and/or K2.

In addition, the substrate 1 has the first groove D1, the second groove D2, a third groove D3, and a fourth groove D4. The first groove D1 is provided in the first control signal electrode 5 between the first input-side signal electrode 53 and the inter-signal-electrode ground electrode 13 in a plan view. Similarly, the second groove D2 is provided in the first control signal electrode 5 between the first input-side signal electrode 53 and the first ground electrode 11 in a plan view. The third groove D3 is provided in the second control signal electrode 7 between the second input-side signal electrode 73 and the inter-signal-electrode ground electrode 13 in a plan view. The fourth groove D4 is provided in the second control signal electrode 7 between the second input-side signal electrode 73 and the second ground electrode 12 in a plan view.

Each of the first groove D1, the second groove D2, the third groove D3, and the fourth groove D4 is a groove in which the Z-axis direction in the main surface 1S of the substrate 1 is set as a depth direction. Each of the first groove D1 and the second groove D2 extends along at least a part of the first input-side signal electrode 53 in a plan view, and extends along a part of the first input-side signal electrode 53 from the one end 1c of the substrate 1 in a plan view in this embodiment. More specifically, each of the first groove D1 and the second groove 32 extends along a part of the first input-side signal electrode 53 from the one end 1c of the substrate 1 in a plan view with an approximately constant width, extends further along a part of the first input-side signal electrode 53 while the width gradually decreases, and terminates.

The width of the first groove D1 and the second groove 32 in a plan view may be approximately constant over the entirety thereof, or have a portion that varies gradually or step by step along an extension direction. When the width varies gradually or step by step, it is possible to prevent reflection and loss of a control signal due to rapid variation in characteristic impedance at each portion of the first groove D1 and the second groove D2. In addition, in a plan view, the first groove D1 and the second groove D2 may extend along the entirety of the first input-side signal electrode 53 or may extend along the entirety of the first control signal electrode 5. In this case, the first arm optical waveguide 31 of the optical waveguide structure 3 may be configured as a ridge type waveguide, and thus this case is advantageous for a wideband and a low operation voltage of the optical control device 100.

Similarly, each of the third groove D3 and the fourth groove D4 extends along at least a part of the second input-side signal electrode 73 in a plan view, and extends along a part of the second input-side signal electrode 73 from the one end 1c of the substrate 1 in a plan view in this embodiment. More specifically, each of the third groove D3 and the fourth groove 54 extends along a part of the second input-side signal electrode 73 from the one end 1c of the substrate 1 in a plan view with an approximately constant width, extends further along a part of the second input-side signal electrode 73 while the width gradually decreases, and terminates.

The width of the third groove 53 and the fourth groove 54 in a plan view may be approximately constant over the entirety thereof, or have a portion that varies, for example, gradually or step by step along the extension direction. When the width varies gradually or step by step, it is possible to prevent reflection and loss of a control signal due to rapid variation in characteristic impedance at each portion of the third groove D3 and the fourth groove D4. In addition, in a plan view, the third groove D3 and the fourth groove D4 may extend along the entirety of the second input-side signal electrode 73 or may extend along the entirety of the second control signal electrode 7. In this case, the second arm optical waveguide 32 of the optical waveguide structure 3 may be configured as a ridge type waveguide, and thus this case is advantageous for a wideband and a low operation voltage of the optical control device 100.

In this embodiment, the shape of the first groove D1, the second groove D2, the third groove D3, and the fourth groove D4 on a cross-section perpendicular to an extension direction of these grooves is a rectangular shape (for example, having a long side along a direction perpendicular to the extension direction). However, the shape may be other shapes such as an elliptical shape (for example, having a long side along a direction perpendicular to the extension direction of these grooves), a circular shape, a trapezoidal shape (for example, having the base along a direction perpendicular to the extension direction of these grooves), an inverted trapezoidal shape (for example, having the base along a direction perpendicular to the extension direction of these grooves), and a rhombic shape (for example, having a side along a direction perpendicular to the extension direction of the grooves).

The width of the first groove D1, the second groove D2, the third groove D3, and the fourth groove D4 in a plan view can be suitably designed in accordance with the width of the input pads 55 and 75, the depth of the first groove D1, the second groove D2, the third groove D3, and the fourth groove D4, and characteristic impedance of the first control signal electrode 5 and the second control signal electrode 7, and the like. For example, in a case where the optical control device 100 is designed as a circuit having an impedance of 50Ω by setting the width of the input pads 55 and 75 to approximately 50 µm to 100 µm which is suitable for wire bonding, and by setting the depth of the first groove D1, the second groove D2, the third groove D3, and the fourth groove D4 to depth of approximately 5 µm to 10 µm which is frequently used for preparation of a ridge waveguide device using a substrate made of lithium niobate, for example, the width of the first groove D1, the second groove D2, the third groove D3, and the fourth groove D4 in a plan view may be set to, for example, 100 µm to 200 µm. In this case, the above-described spaced distance K1 and K2 may be set as small as 150 µm to 300 µm. On the other hand, in a case where grooves such as the first groove D1, the second groove D2, the third groove D3, and the fourth groove D4 are not formed in the substrate under the same conditions, when the optical control device is designed to have an impedance of 50Ω, the above-described spaced distance K1 and K2 becomes 310 µm to 620 µm.

Accordingly, in a case where the substrate 1 does not have the grooves such as the first groove D1, the second groove D2, the third groove D3, and the fourth groove D4, even when the spaced distance D between the first input-side signal electrode 53 and the second input-side signal electrode 73 is the same as in the case where the substrate 1 has the grooves similar to the optical control device 100 of this embodiment, the value of D/K increases approximately twice. As described above, in the optical control device 100 of this embodiment, since the first groove D1, the second groove D2, the third groove D3, and the fourth groove D4 are formed in the substrate 1, it is possible to further reduce the spaced distance K1 between the one end 11E of the first ground electrode 11 and the one end 13E of the inter-signal-electrode ground electrode 13 along the first direction, and the spaced distance K2 between the one end 12E of the second ground electrode 12 and the one end 13E of the inter-signal-electrode ground electrode 13 along the first direction in comparison to a case of an optical control device in the related art.

In the above-described optical control device 100 according to this embodiment, since the substrate 1 has the first groove D1 and the second groove D2, it is possible to further reduce the spaced distance K1 between the one end 11E of the first ground electrode 11 and the one end 13E of the inter-signal-electrode ground electrode 13 along the first direction in comparison to a case where the substrate 1 does not have these grooves (refer to FIG. 4). In a case where the spaced distance K1 is small, for example, it is also possible to reduce the spaced distance between the first input-side signal electrode 53 of a coplanar type and the first ground electrode 11, and the spaced distance between the first input-side signal electrode 53 and the inter-signal-electrode ground electrode 13. According to this, it is possible to reduce spreading of lines of electric force between the first input-side signal electrode 53 and the first ground electrode 11, and between the first input-side signal electrode 53 and the inter-signal-electrode ground electrode 13, and thus it is possible to more effectively terminate the lines of electric force which extend from the first input-side signal electrode 53 to the first ground electrode 11 and the second inter-signal-electrode ground electrode 12. That is, even though the spaced distance D between the first input-side signal electrode 53 and the second input-side signal electrode 73 is not large, when the substrate 1 has the first groove D1 and the second groove D2, the lines of electric force which occur from the first input-side signal electrode 53 are more effectively terminated. Accordingly, it is possible to reduce cross-talk of a control signal propagating through the inside of the first input-side signal electrode 53 to a control signal propagating through the inside of the second input-side signal electrode 73 (refer to FIG. 2 to FIG. 4).

Similarly, since the substrate 1 has the third groove D3 and the fourth groove D4, it is possible to further reduce the spaced distance K2 between the one end 12E of the second ground electrode 12 and the one end 13E of the inter-signal-electrode ground electrode 13 along the first direction in comparison to a case where the substrate 1 does not have these grooves (refer to FIG. 4). In a case where the spaced distance K2 is small, for example, it is also possible to reduce the spaced distance between the second input-side signal electrode 73 of a coplanar type and the second ground electrode 12 and the spaced distance between the second input-side signal electrode 73 and the inter-signal-electrode ground electrode 13. According to this, it is possible to reduce spreading of lines of electric force between the second input-side signal electrode 73 and the second ground electrode 12 and between the second input-side signal electrode 73 and the inter-signal-electrode ground electrode 13, and thus it is possible to more effectively terminate the lines of electric force which extend from the second input-side signal electrode 73 to the second ground electrode 12 and the inter-signal-electrode ground electrode 13. That is, even though the spaced distance D between the first input-side signal electrode 53 and the second input-side signal electrode 73 is the same, when the substrate 1 has the third groove D3 and the fourth groove D4, the lines of electric force which occur from the second input-side signal electrode 73 are more effectively terminated. Accordingly, it is possible to reduce cross-talk between a control signal propagating through the inside of the second input-side signal electrode 73 and a control signal propagating through the inside of the first input-side signal electrode 53 (refer to FIG. 2 to FIG. 4). As a result, according to the optical control device 100 according to this embodiment, it is possible to suppress cross-talk between the first input-side signal electrode 53 and the second input-side signal electrode 73.

In addition, in the optical control device 100 according to this embodiment, as the depth of the first groove D1, the second groove D2, the third groove D3, and the fourth groove D4 along the Z-axis direction becomes deeper, an effect of reducing the cross-talk between the first input-side signal electrode 53 and the second input-side signal electrode 73 becomes higher. From this viewpoint, the depth may be set to 2 μm or more, 4 μm or more, and 6 μm or more. In a case of preparing the optical control device 100 including a signal input and output part having an impedance of 50Ω by using the substrate 1 that is made of a material such as lithium niobate having a high dielectric constant, an effect of reducing the spaced distance K1 and K2 due to formation of the first groove D1, the second groove D2, the third groove D3, and the fourth groove D4 is high. For example, in a case where the depth of the grooves is 2 μm, 4 μm, and 6 μm, it is possible to reduce the spaced distances K1 and K2 by more than 10%, by approximately 30%, and by less than 40%. Accordingly, when the depth of the grooves is 2 μm, the effect of reducing the cross-talk between the first input-side signal electrode 53 and the second input-side signal electrode 73 becomes particularly high, and in a case where the depth is 4 μm or more, and 6 μm or more, the cross-talk reducing effect becomes more significant.

In addition, in the optical control device 100 according to this embodiment, the depth of the first groove D1, the second groove D2, the third groove D3, and the fourth groove D4 along the Z-axis direction may be set to a depth of 10 μm or more. As the depth becomes greater, the effect of reducing the cross-talk between the first input-side signal electrode 53 and the second input-side signal electrode 73 becomes higher. However, in a case of using the substrate 1 made of a brittle material such as lithium niobate which is difficult to process, the processing depth of the first groove D1, the second groove D2, the third groove D3, and the fourth groove D4 may be limited to avoid breakage of the substrate 1, a decrease in reliability, an increase in the processing cost, and the like.

In this embodiment, a cross-sectional shape of the first groove D1, the second groove D2, the third groove D3, and the fourth groove D4 (cross-sectional shape on a plane in a direction perpendicular to an extension direction of the grooves) is a rectangular shape. However, the cross-sectional shape may be other shapes such as a trapezoidal shape, an inverted trapezoidal shape, a U shape, or a V shape. In addition, the crass-sectional shape and width of the first groove D1, the second groove D2, the third groove D3, and the fourth groove D4 may be the same or different in each case.

In a case of manufacturing the optical control device 100 by using the substrate 1 made of lithium niobate, when performing grooving with respect to the substrate 1, a reactive ion etching method, a chemical etching method, ablation processing using a laser, mechanical processing using an abrasive grain or an ultra-hard material, and the like are used. Typically, a groove that is formed has an inverted trapezoidal shape, a U shape, and a V shape in which a hole part is wide and the bottom is narrow. In this embodiment, the cross-sectional shape of the first groove D1, the second groove D2, the third groove D3, and the fourth groove D4 may be set to an arbitrary shape among the above-described shape. However, so as to decrease a scale of characteristic analysis calculation, a cross-sectional shape such as a rectangular shape or a trapezoidal shape, and a symmetrical disposition of grooves having the same shape are possible. The symmetrical disposition of grooves having the same shape is desirable when considering dispersion of stress and distortion in the substrate and retention of the strength of the substrate in practical use.

In addition, in the optical control device 100 according to this embodiment, the one end 11E of the first ground electrode 11, the one end 53E of the first input-side signal electrode 53, the one end 13E of the inter-signal-electrode ground electrode 13, the one end 73E of the second input-side signal electrode 73, and the one end 12E of the second ground electrode 12 are disposed along the first direction (Y-axis direction) along the main surface 1S of the substrate 1 in this order (refer to FIG. 2 to FIG. 4). In this case, in relationships of the spaced distance D between the one end 53E of the first input-side signal electrode 53 and the one end 73E of the second input-side signal electrode 73 along the first direction, the spaced distance K1 between the one end 11E of the first ground electrode 11 and the one end 13E of the inter-signal-electrode ground electrode 13 along the first direction, and the spaced distance K2 between the one end 12E of the second ground electrode 12 and the one end 13E of the inter-signal-electrode ground electrode 13 along the first direction, it is desirable to increase a value of D/K1 and a value of D/K2 for a reduction in the cross-talk. However, according to the optical control device 100 of this embodiment, as described above, it is possible to suppress the cross-talk between the first input-side signal electrode 53 and the second input-side signal electrode 73, and thus the value of D/K1 and the value of D/K2 may be set to 3.0 or less, respectively.

The present inventors have obtained the following finding. In the optical control device of the related art in which the value of D/K1 or D/K2 is set to satisfy the above-described condition, cross-talk between an element corresponding to the first input-side signal electrode 53 and an element corresponding to the second input-side signal electrode 73, the cross-talk is particularly likely to occur. Accordingly, when the invention of this embodiment is applied to an optical control device in such a manner that the value of D/K1 and/or D/K2 satisfies the condition, the effect of this embodiment is exhibited in a particularly effective manner.

Second Embodiment

Next, a second embodiment of the invention will be described. In subsequent embodiments including the second embodiment, a difference from the other embodiments will be mainly described, and the same reference numeral will be given to the same element in the other embodiments, and detailed description thereof may be omitted in some cases.

Figure 5:
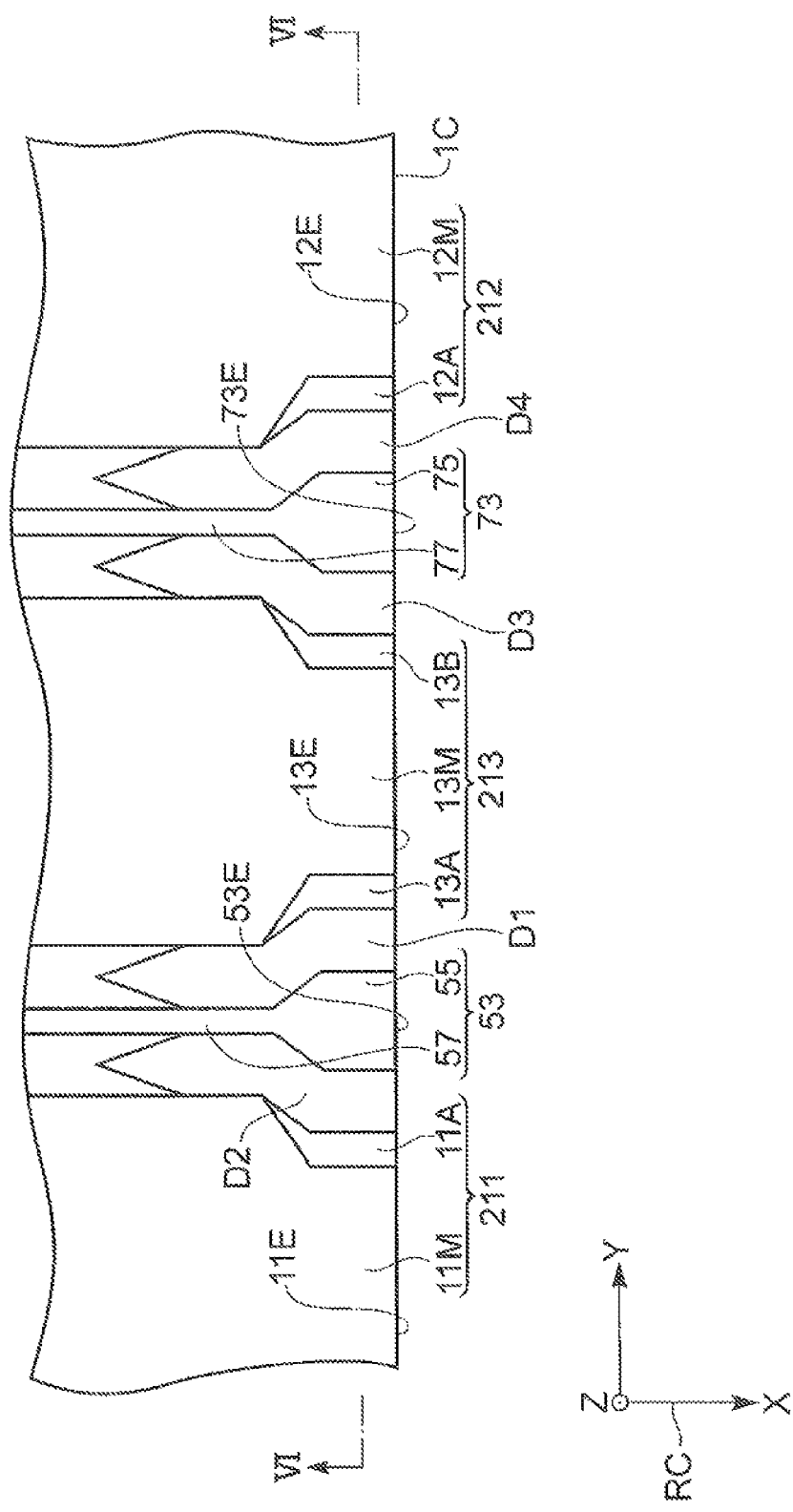
FIG. 5 is a plan view illustrating the configuration of a first input-side signal electrode of a first control signal electrode and a first input-side signal electrode of a second control signal electrode according to a second embodiment in the vicinity of ends on one side.
Figure 6:
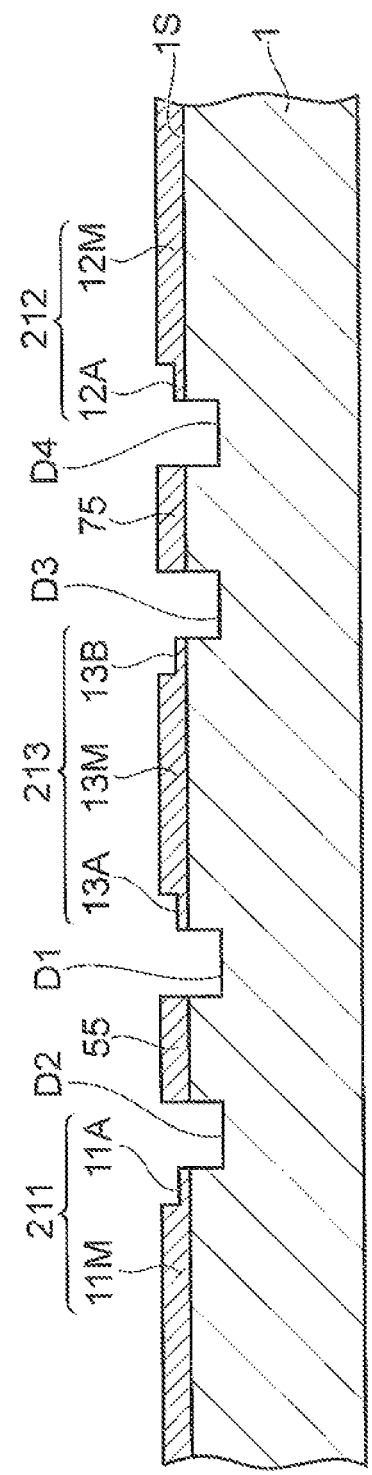
FIG. 6 is an end view of an optical control device which is taken along line VI-VI in FIG. 5.

FIG. 5 is a plan view illustrating the configuration of a first input-side signal electrode of a first control signal electrode and a first input-side signal electrode of a second control signal electrode according to the second embodiment in the vicinity of ends on one side. FIG. 6 is an end view of an optical control device which is taken along line VI-VI in FIG. 5.

An optical control device of the second embodiment is different from the optical control device 100 of the first embodiment in the configuration of the first ground electrode, the second ground electrode, and the inter-signal-electrode ground electrode.

Specifically, a first ground electrode 211 of this embodiment is different from the first ground electrode 11 (refer to FIG. 2 to FIG. 4) of the first embodiment in that the first ground electrode 211 includes main part 11M and a small-thickness part 11A provided on a second groove D2 side in comparison to the main part 11M. The thickness of the small-thickness part 11A is smaller than that of the main part 11M, and may be set to, for example, 1 µm to 3 µm. The thickness of the main part 11M is the same as that of the first ground electrode 11 of the first embodiment.

In addition, a second ground electrode 212 of this embodiment is different from the second ground electrode 12 (refer to FIG. 2 to FIG. 4) of the first embodiment in that the second ground electrode 212 includes a main part 12M and a small-thickness part 12A provided on a fourth groove D4 side in comparison to the main part 12M. The thickness of the small-thickness part 12A is smaller than that of the main part 12M, and may be set to, for example, 1 µm to 3 µm. The thickness of the main part 12M is the same as that of the second ground electrode 12 of the first embodiment.

In addition, an inter-signal-electrode ground electrode 213 of this embodiment includes a main part 13M, a first small-thickness part 13A provided on a first groove D1 side in comparison to the main part 13M, and a second small-thickness part 13B provided on a third groove D3 side in comparison to the main part 13M. The thickness of the first small-thickness part 13A and the second small-thickness part 13B is smaller than that of the main part 13M, and may be set to, for example, 1 µm to 3 µm. The thickness of the main part 13M is the same as that of the inter-signal-electrode ground electrode 13 of the first embodiment.

The small-thickness part 11A of the first ground electrode 211 and the first small-thickness part 13A of the inter-signal-electrode ground electrode 213 extend from one end 11E of the first ground electrode 211 and one end 13E of the inter-signal-electrode ground electrode 213 along a part of the first input-side signal electrode 53, respectively, in a plan view. The small-thickness parts 11A and 13A may extend from the one end 11E and the one end 13E along the entirety of the first input-side signal electrode 53 or the entirety of the first control signal electrode 5 in a plan view. The small-thickness part 12A of the second ground electrode 212 and the second small-thickness part 13B of the inter-signal-electrode ground electrode 213 may extend from the one end 12E of the second ground electrode 212 and the one end 13E of the inter-signal-electrode ground electrode 213 along a part of the second input-side signal electrode 73, respectively, in a plan view. The small-thickness parts 12A and 13B may extend from the one end 12E and the one end 13E along the entirety of the second input-side signal electrode 73 or the entirety of the second control signal electrode 7 in a plan view.

According to the optical control device of this embodiment as described above, as is the case with the optical control device 100 of the first embodiment, it is possible to suppress the cross-talk between the first input-side signal electrode 53 and the second input-side signal electrode 73 due to an effect of reducing spreading of lines of electric force between the first input-side signal electrode 53 and the first ground electrode 211 and between the first input-side signal electrode 53 and the inter-signal-electrode ground electrode 213, and an effect of reducing spreading of lines of electric force between the second input-side signal electrode 73 and the second ground electrode 212 and between the second input-side signal electrode 73 and the inter-signal-electrode ground electrode 213.

According to the optical control device of this embodiment as described above, the inter-signal-electrode ground electrode 213 has a step difference between the main part 13M and the first small-thickness part 13A, and the first ground electrode 211 has a step difference between the main part 11M and the small-thickness part 11A (refer to FIG. 6), and thus the surface area of the inter-signal-electrode ground electrode 213 and the first ground electrode 211, which face the first input-side signal electrode 53, increases. According to this, the lines of electric force which are radiated from the first input-side signal electrode 53 are likely to terminate at the inter-signal-electrode ground electrode 213 and the first ground electrode 211, and thus the lines of electric force are suppressed from reaching the second input-side signal electrode 73.

Similarly, the inter-signal-electrode ground electrode 213 has a step difference between the main part 13M and the second small-thickness part 13B, and the second ground electrode 212 has a step difference between the main part 12M and the small-thickness part 12A. Accordingly, a surface area of the inter-signal-electrode ground electrode 213 and the second ground electrode 212, which face the second input-side signal electrode 73, increases (refer to FIG. 6). According to this, the lines of electric force which are radiated from the second input-side signal electrode 73 are likely to terminate at the inter-signal-electrode ground electrode 213 and the second ground electrode 212, and thus the lines of electric force are suppressed from reaching the first input-side signal electrode 53. As a result, it is possible to further suppress the cross-talk between the first input-side signal electrode 53 and the second input-side signal electrode 73.

In the second embodiment, means for increasing the surface area of the first ground electrode 211 and the inter-signal-electrode ground electrode 213 which face the first input-side signal electrode 53, and the surface area of the inter-signal-electrode ground electrode 213 and the second ground electrode 212 which face the second input-side signal electrode 73, which is used in combination with the formation of the grooves, is a countermeasure effective for a reduction in the cross-talk even when being used alone, but is substantially accompanied with a decrease in characteristic impedance. In addition, in a coplanar type electrode on a substrate made of a material such as lithium niobate having a high dielectric constant, as means for increasing the characteristic impedance, it is particularly effective to form the grooves. Accordingly, according to the optical control device of the second embodiment which uses the above-described two kinds of means in combination with each other, it is possible to simultaneously attain improvement in a reduction of the cross-talk and improvement in the degree of freedom of design which are compatible with each other, and thus a significant synergistic effect is exhibited.

In this embodiment, the small-thickness part 11A of the first ground electrode 211 and the first small-thickness part 13A of the inter-signal-electrode ground electrode 213 are disposed to be approximately symmetrical to an extension direction of the first input-side signal electrode 53 in a plan view, but these parts may be disposed to be asymmetrical to the extension direction of the first input-side signal electrode 53 in a plan view. In addition, the thickness of the small-thickness part 11A and the thickness of the first small-thickness part 13A may be the same as each other or may be different from each other. Similarly, the second small-thickness part 13B of the inter-signal-electrode ground electrode 213 and the small-thickness part 12A of the second ground electrode 212 are disposed to be approximately symmetrical to the extension direction of the second input-side signal electrode 73 in a plan view, but these may be disposed to be asymmetrical to the extension direction of the second input-side signal electrode 73 in a plan view. In addition, the thickness of the second small-thickness part 13B and the thickness of the small-thickness part 12A may be the same as each other, or may be different from each other.

In a case where two control signal electrodes are provided, a contribution ratio to the effect of suppressing the cross-talk is different between the first small-thickness part 13A and the second small-thickness part 13B which are formed on an inter-signal-electrode ground electrode 213 side in comparison to the two control signal electrodes, and the small-thickness part 11A and the small-thickness part 12A which are formed on a first ground electrode 211 side and on a second ground electrode 212 side in comparison to the two control signal electrodes. For convenience of design, so as to decrease a scale in characteristic analysis calculation, the small-thickness part 11A and the first small-thickness part 13A may be disposed to be symmetrical to the extension direction of the first input-side signal electrode 53, and the second small-thickness part 13B and the small-thickness part 12A may be disposed to be symmetrical to the extension direction of the second input-side signal electrode 73. The symmetrical disposition is also desirable when considering dispersion of stress and distortion in the substrate. In addition, in this embodiment, four small-thickness parts are present in the ground electrodes (that is, the small-thickness part 11R of the first ground electrode 211, the small-thickness part 12A of the second ground electrode 212, the first small-thickness part 13A of the inter-signal-electrode ground electrode 213, and the second small-thickness part 13B of the inter-signal-electrode ground electrode 213 are present). However, in this embodiment, at least one among the four small-thickness parts may be present, or plural small-thickness parts may be selectively present.

Third Embodiment

Figure 7:
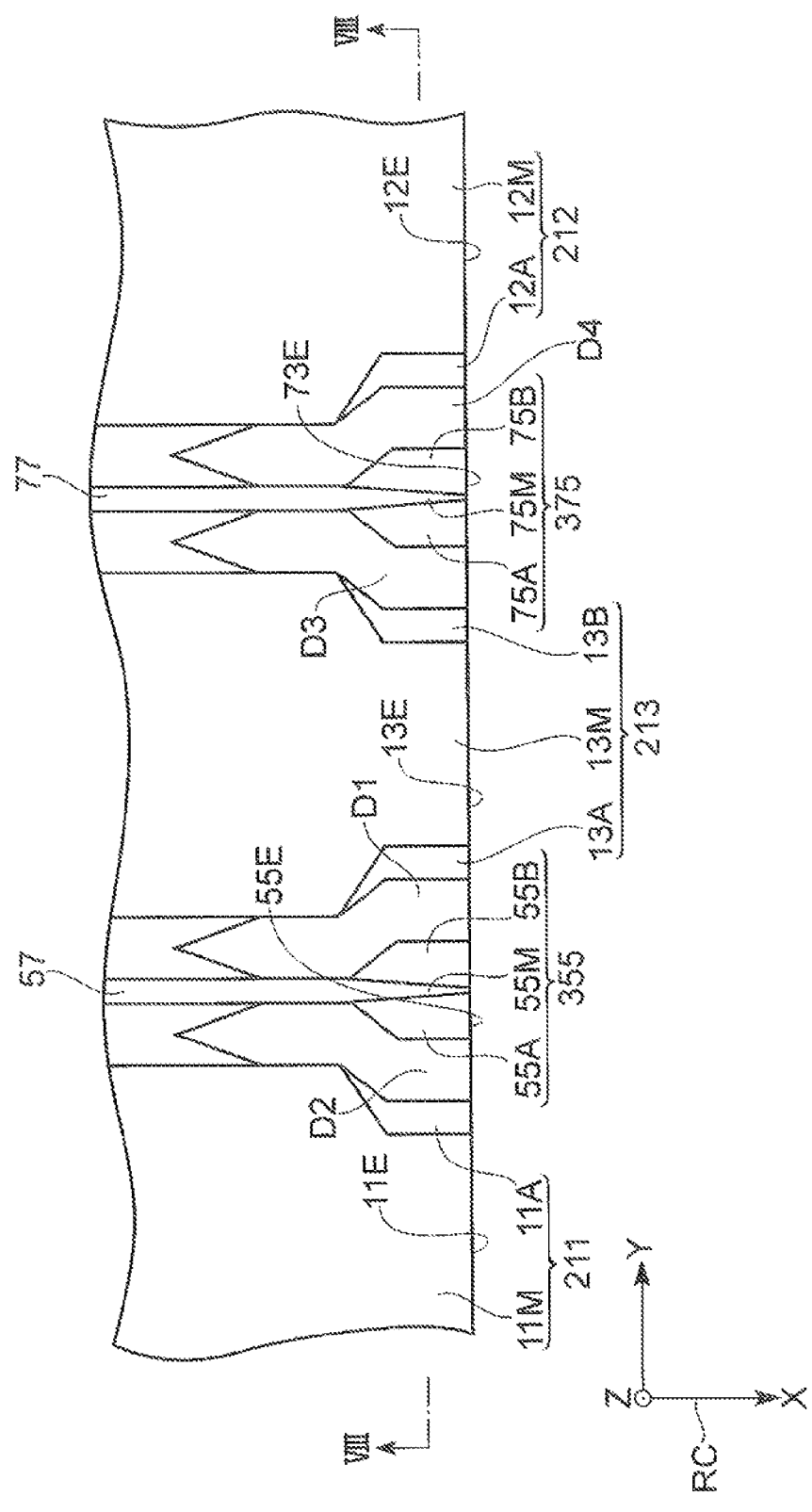
FIG. 7 is a plan view illustrating the configuration of a first input-side signal electrode of a first control signal electrode and a first input-side signal electrode of a second control signal electrode according to a third embodiment in the vicinity of ends on one side.
Figure 8:
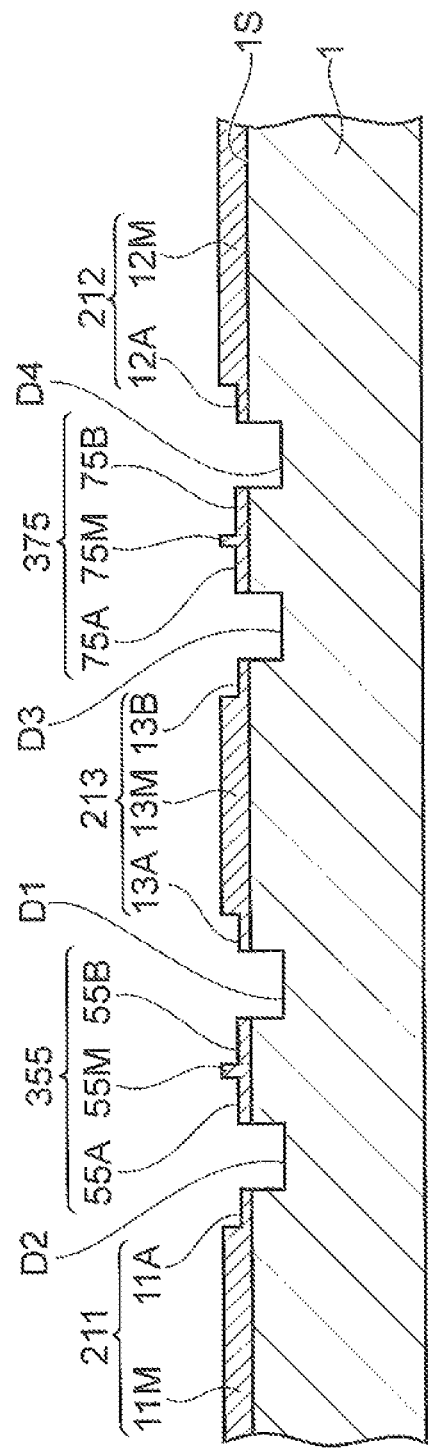
FIG. 8 is an end view of an optical control device which is taken along line VIII-VIII in FIG. 7.

Next, a third embodiment of the invention will be described. FIG. 7 is a plan view illustrating the configuration of a first input-side signal electrode of a first control signal electrode and a first input-side signal electrode of a second control signal electrode according to the third embodiment in the vicinity of ends on one side, and FIG. 8 is an end view of the optical control device which is taken along line VIII-VIII in FIG. 7.

The optical control device of the third embodiment is different from the optical control device 100 of the first embodiment in the configuration of the first input-side signal electrode of the first control signal electrode, and the first input-side signal electrode of the second control signal electrode.

Specifically, a first input-side signal electrode 355 of a first control signal electrode 5 of this embodiment is different from the input pad 55 of the second embodiment (refer to FIG. 5 and FIG. 6) in that the first input-side signal electrode 355 includes a main part 55M, a first small-thickness part 55A provided on a second groove D2 side in comparison to the main part 55M, and a second small-thickness part 55B provided on a first groove D1 side in comparison to the main part 55M. The thickness of each of the first small-thickness part 55A and the second small-thickness part 55B is smaller than that of the main part 55M, and may be set to, for example, 2 μm to 5 μm. The thickness of the main part 55M is the same as that of the input pad 55 of the second embodiment.

In addition, a second input-side signal electrode 375 of a second control signal electrode 7 of this embodiment is different from the input pad 75 (refer to FIG. 5 and FIG. 6) of the second embodiment in that the second input-side signal electrode 375 includes a main part 75M, a first small-thickness part 75A provided on a third groove D3 side in comparison to the main part 75M, and a second small-thickness part 75B provided on a fourth groove D4 side in comparison to the main part 75M. The thickness of each of the first small-thickness part 75A and the second small-thickness part 75B is smaller than that of the main part 75M, and may be set to, for example, 2 μm to 5 μm. The thickness of the main part 75M is the same as that of the input pad 75 of the second embodiment.

The first small-thickness part 55A and the second small-thickness part 55B are provided at the portion of the input pad of the first input-side signal electrode 53 of the first control signal electrode 5. However, this thin layer part may 10' be provided on the entirety or a part in the extension direction of the signal transmitting part 57 of the first control signal electrode 5 or may be provided on the entirety or a part in the extension direction of the first control signal electrode 5 in addition to or in substitution for the portion of the input pad. In addition, the first small-thickness part 75A and the second small-thickness part 75B are provided at the portion of the input pad of the second input-side signal electrode 73 of the second control signal electrode 7. However, this thin layer portion may be provided on the entirety or a part in the extension direction of the signal transmitting part 77 of the second control signal electrode 7, or may be provided on the entirety or a part in the extension direction of the second control signal electrode 7 in addition to or in substitution for the portion of the input pad.

According to the optical control device of this embodiment as described above, as is the case with the optical control devices 100 of the first and second embodiments, it is possible to suppress the cross-talk between the first input-side signal electrode 355 and the second input-side signal electrode 375 due to an effect of reducing spreading of lines of electric force between the first input-side signal electrode 355 and the first ground electrode 211 and between the first input-side signal electrode 355 and the inter-signal-electrode ground electrode 213, and an effect of reducing spreading of lines of electric force between the second input-side signal electrode 375 and the second ground electrode 212 and between the second input-side signal electrode 375 and the inter-signal-electrode ground electrode 213.

According to the optical control device of this embodiment as described above, when the first electrical signal S1 is applied to the first input-side signal electrode 355 from an outer side, an electric field is concentrated to the first small-thickness part 55A and the second small-thickness part 55B which have a small thickness, and thus lines of electric force are radiated mainly from the first small-thickness part 55A and the second small-thickness part 55B. In addition, the first small-thickness part 55A and the second small-thickness part 553 of the first input-side signal electrode 355 emit the lines of electric force from a position that is lower and closer to the substrate 1 in comparison to the main part 55M, and thus the lines of electric force which are radiated from these small-thickness parts are suppressed from reaching the second input-side signal electrode 375 through an upper side of the main surface 1S of the substrate 1.

Similarly, when the second electrical signal S2 is applied to the second input-side signal electrode 375 from an outer side, an electric field is concentrated to the first small-thickness part 75A and the second small-thickness part 75B which have a small thickness, and thus lines of electric force are radiated mainly from the first small-thickness part 75A and the second small-thickness part 75B. In addition, the first small-thickness part 75A and the second small-thickness part 75B of the second input-side signal electrode 375 emit the lines of electric force from a position that is lower and closer to the substrate 1 in comparison to the main part 75M, and thus the lines of electric force which are radiated from these small-thickness parts are suppressed from reaching the first input-side signal electrode 355 through an upper side of the main surface 1S of the substrate 1. As a result, it is possible to further suppress the cross-talk between the first input-side signal electrode 355 and the second input-side signal electrode 375.

In the third embodiment, means for forming a multi-step in the first input-side signal electrode 355 and the second input-side signal electrode 375, which is used in combination of the formation of grooves, is a countermeasure effective for a reduction of the cross-talk even when being used alone. However, the means is a method of increasing the surface area of the first input-side signal electrode 355 and the second input-side signal electrode 375 which face the first ground electrode 211, the second ground electrode 212, and the inter-signal-electrode ground electrode 213, and is substantially accompanied with a decrease in characteristic impedance. Accordingly, the formation of the grooves, which has a high effect as means for increasing the characteristic impedance, is particularly effective. Therefore, according to the optical control device of the third embodiment in which the formation of grooves and means for forming a multi-step are used in combination with each other, it is possible to simultaneously attain improvement in a reduction of the cross-talk and improvement in the degree of freedom of design which are compatible with each other, and thus a high synergistic effect is exhibited.

In this embodiment, the first small-thickness part 55A and the second small-thickness part 55B are disposed to be approximately symmetrical to the extension direction of the first input-side signal electrode in a plan view, but these parts may be disposed to be asymmetrical to the extension direction of the first input-side signal electrode in a plan view. In addition, the thickness of the first small-thickness part 55A and the thickness of the second small-thickness part 555 may be the same as each other or may be different from each other. Similarly, the first small-thickness part 75A and the second small-thickness part 755 are disposed to be approximately symmetrical to the extension direction of the second input-side signal electrode in a plan view, but these parts may be disposed to be asymmetrical to the extension direction of the second input-side signal electrode in a plan view. In addition, the thickness of the first small-thickness part 75A and the thickness of the second small-thickness part 75B may be the same as each other or may be different from each other.

In a case where two control signal electrodes are provided, a contribution ratio to the effect of suppressing the cross-talk is different between the second small-thickness part 55B and the first small-thickness part 75A which are provided on an inter-signal-electrode ground electrode 213 side in comparison to the two control signal electrodes, and the first small-thickness part 55A and the second small-thickness part 75B which are provided on a first ground electrode 211 side and a second ground electrode 212 side in comparison to the two control signal electrodes. For convenience of design, so as to decrease a scale in characteristic analysis calculation, the first small-thickness part 55A and the second small-thickness part 55B may be disposed to be symmetrical to the extension direction of the first input-side signal electrode 355, and the first small-thickness part 75A and the second small-thickness part 753 may be disposed to be symmetrical to the extension direction of the second input-side signal electrode 375. The symmetrical disposition is also desirable when considering dispersion of stress and distortion in the substrate. In addition, in this embodiment, four small-thickness parts are present in the signal electrode (that is, the first small-thickness part 55A of the first input-side signal electrode 355 and the second small-thickness part 553 of the first input-side signal electrode 355, and the first small-thickness part 75A of the second input-side signal electrode 375 and the second small-thickness part 75B of the second input-side signal electrode 375 are present). However, in this embodiment, at least one among the four small-thickness parts may be present, or plural small-thickness parts may be selectively present.

Fourth Embodiment

Figure 9:
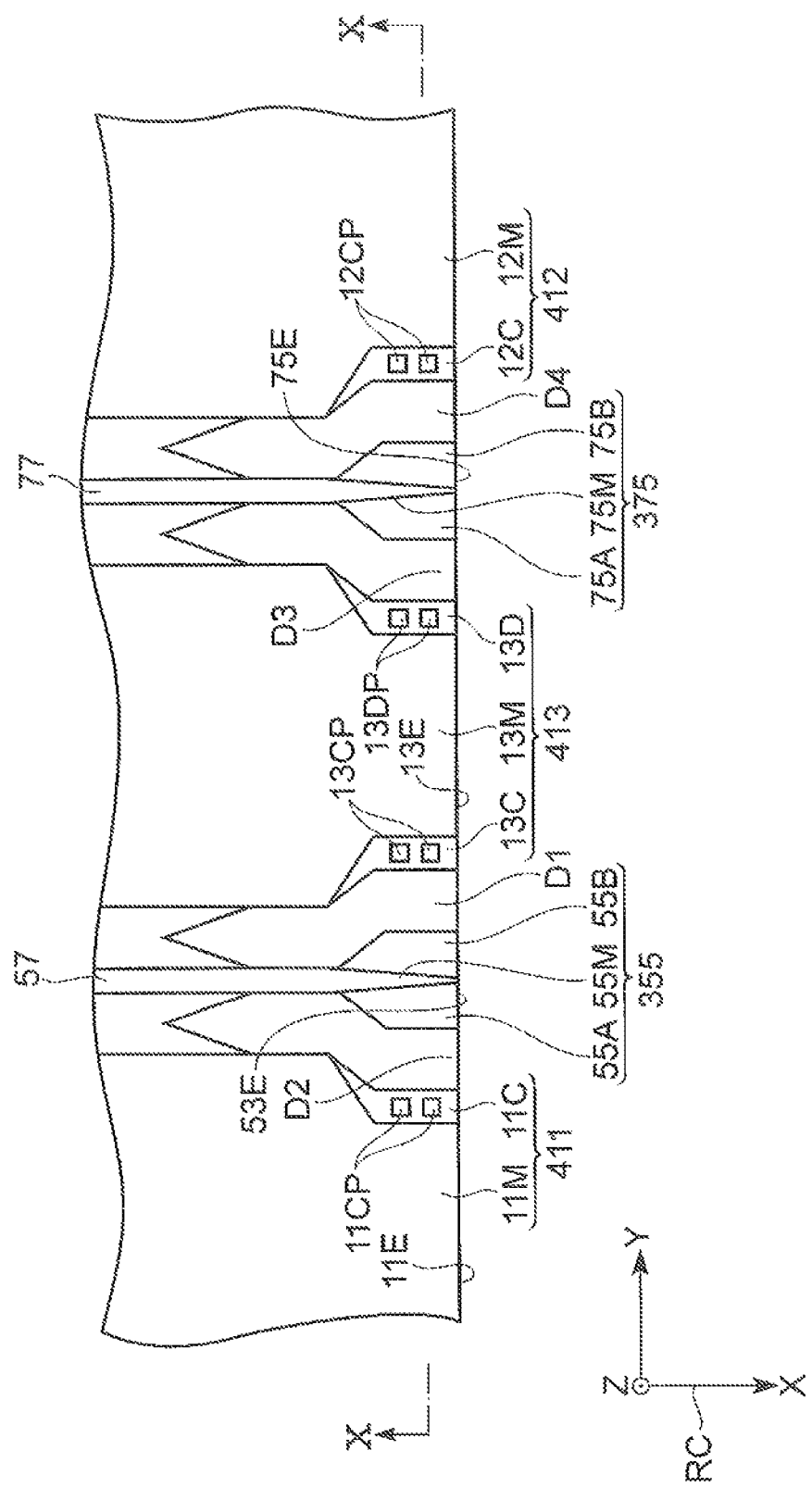
FIG. 9 is a plan view illustrating a configuration of a first input-side signal electrode of a first control signal electrode, and a first input-side signal electrode of a second control signal electrode according to a fourth embodiment in the vicinity of ends on one side.
Figure 10:
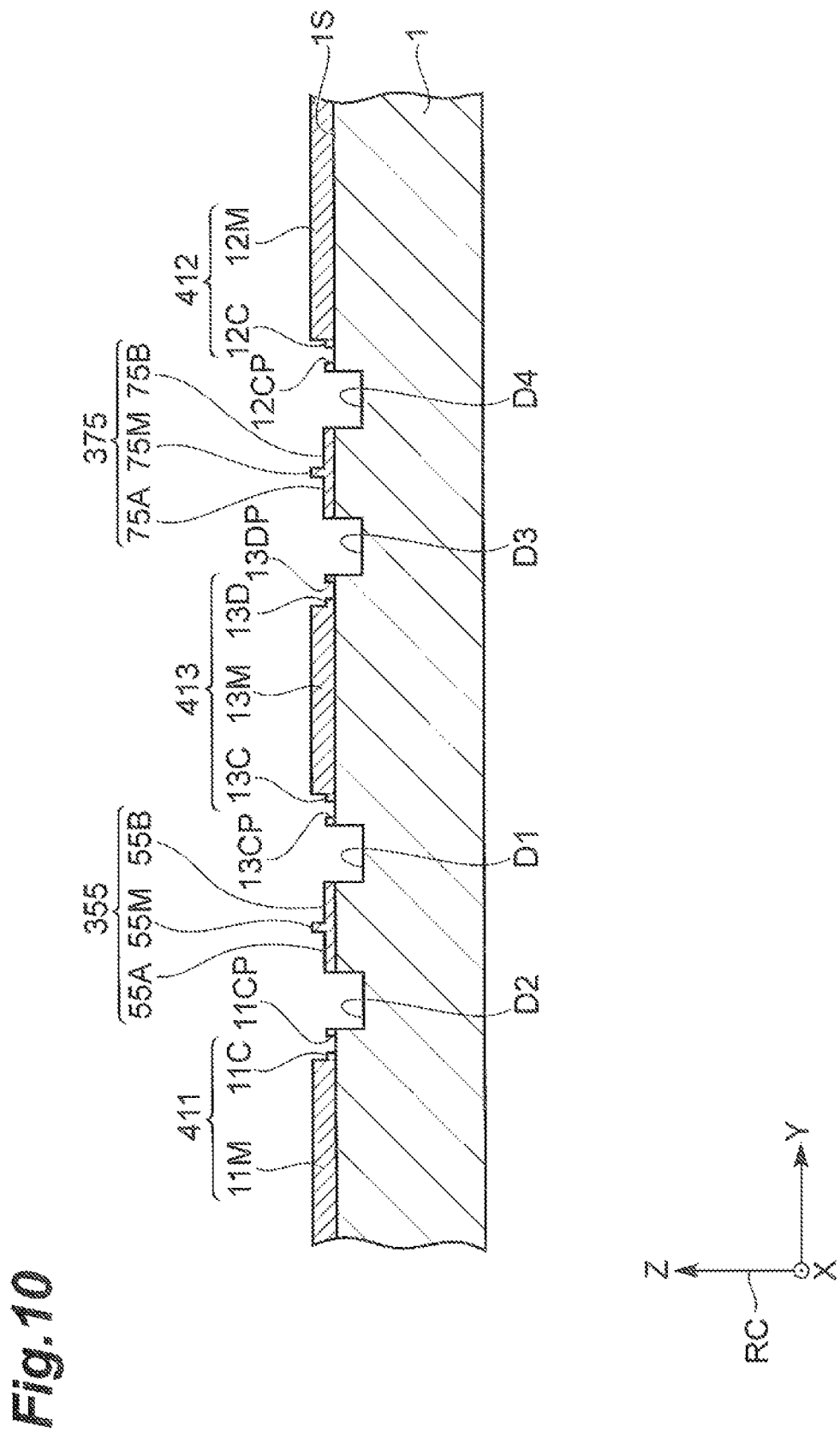
FIG. 10 is an end view of an optical control device which is taken along line X-X in FIG. 9.

Next, a fourth embodiment of the invention will be described. FIG. 9 is a plan view illustrating the configuration of a first input-side signal electrode of a first control signal electrode and a first input-side signal electrode of a second control signal electrode according to the fourth embodiment in the vicinity of ends on one side of the first input-side signal electrode, and FIG. 10 is an end view of an optical control device which is taken along line X-X in FIG. 9.

An optical control device of the fourth embodiment is different from the optical control device of the third embodiment in the configuration of the first ground electrode, the second ground electrode, and the inter-signal-electrode ground electrode.

Specifically, a first ground electrode 411 of this embodiment is different from the first ground electrode 211 of the third embodiment in that the first ground electrode 411 includes a small-thickness part 11C instead of the small-thickness part 11A (refer to FIG. 7 and FIG. 8) of the third embodiment. In addition, the small-thickness part 11C is different from the small-thickness part 11A of the third embodiment in that the small-thickness part 11c has plural through-holes 11CP. The through-holes 11CP are holes penetrating through the small-thickness part 11C in a thickness direction thereof. In addition, the small-thickness part 11C may have only one of the through-holes 11CP.

In addition, a second ground electrode 412 of this embodiment is different from the second ground electrode 212 of the third embodiment in that the second ground electrode 412 includes a small-thickness part 12C instead of the small-thickness part 12A (refer to FIG. 7 and FIG. 8) of the third embodiment. In addition, the small-thickness part 12C is different from the small-thickness part 12A of the third embodiment in that the small-thickness part 12C has plural through-holes 12CP. The through-holes 12CP are holes penetrating through the small-thickness part 120 in a thickness direction thereof. In addition, the small-thickness part 12C may have only one of the through-holes 12CP.

In addition, an inter-signal-electrode ground electrode 413 of this embodiment is different from the inter-signal-electrode ground electrode 213 of the third embodiment in that the inter-signal-electrode ground electrode 413 includes a first small-thickness part 13C and a second small-thickness part 13D instead of the first small-thickness part 13A and the second small-thickness part 13B (refer to FIG. 7 and FIG. 8) of the third embodiment. In addition, the first small-thickness part 13C is different from the first small-thickness part 13A of the third embodiment in that the first small-thickness part 13C has plural through-holes 13CP, and the second small-thickness part 13D is different from the second small-thickness part 13B of the third embodiment in that the second small-thickness part 130 has plural through-holes 130P. The through-holes 13CP are holes penetrating through the first small-thickness part 13C in a thickness direction thereof, and the through-holes 13DP are holes penetrating through the second small-thickness part 130 in a thickness direction thereof. In addition, the first small-thickness part 13C may have only one of the through-holes 13CP, and the second small-thickness part 130 may have only one of the through-holes 13DP.

In a case where the small-thickness part 11C of the first ground electrode 411 and the first small-thickness part 13C of the inter-signal-electrode ground electrode 413 extend from the one end 11E and the one end 13E along the entirety of the first input-side signal electrode 355 or the entirety of the first control signal electrode 5 in a plan view, one or plural through-holes 11CP or 13CP may be provided over the entirety or at a part of the small-thickness part 11C or the first small-thickness part 13C. In a case where the small-thickness part 120 of the second ground electrode 412 and the second small-thickness part 130 of the inter-signal-electrode ground electrode 413 extend from the one end 12E and the one end 13E along the entirety of the second input-side signal electrode 375 or the entirety of the second control signal electrode 7 in a plan view, one or plural through-holes 12CP or 130P may also be provided along the entirety or at a part of the small-thickness part 120 or the second small-thickness part 13D. The through-holes 1102, 12CP, 13CP, and 13DP may be appropriately disposed at a section in which cross-talk characteristics are desired to be improved.

For example, the shape of the through-holes 11CP, 12CP, 13CP, and 13DP in a plan view is a rectangular shape, but may be other shapes such as a circular shape and an elliptical shape. In addition, the shape of the through-holes 11CP, 12CP, 13CP, and 13DP in a plan view may be the same or different in each case. The through-holes 11CP, 12CP, 13CP, and 13DP may be discretely distributed, or may be formed at a predetermined cycle along the extension direction of the first input-side signal electrode 53 or the second input-side signal electrode 73. The scale of a characteristic simulation of the first control signal electrode 5 and the second control signal electrode 7 may be small in a case where the through-holes 11CP, 12CP, 13CP, and 13DP, which have the same shape in a plan view, are periodically disposed along the extension direction of the first input-side signal electrode 355 or the second input-side signal electrode 375 in comparison to a case where the through-holes 11CP, 12CP, 13CP, and 13DP are discretely arranged, or the through-holes 11CP, 12CP, 13CP, and 13DP, which have shapes different from each other in a plan view, are provided. Accordingly, it is easy to design, and it is easy to prevent a loss of a propagation signal and the like due to unintentional discontinuity of impedance.

In addition, in a case where the through-holes 11CP, 12CP, 13CP, and 13DP are periodically disposed along the extension direction of the first input-side signal electrode 355 or the second input-side signal electrode 375, the structure operates as a band pass filter circuit corresponding to a specific frequency. Accordingly, a specific frequency signal may be coupled to the band pass filter circuit, and thus a modulation signal propagating through the inside of the first control signal electrode 5 and the second control signal electrode 7 may degrade. The degradation of the modulation signal may be avoided by setting the period of providing the through-holes 11CP, 12CP, 13CP, and 13DP to ¼ times or less of a wavelength of a main frequency component of the modulation signal (in the band pass filter circuit, a wavelength of a frequency component thereof).

In this embodiment, each of the through-holes 11CP and each of the through-holes 13CP are disposed to be approximately symmetrical to the extension direction of the first input-side signal electrode 355 in a plan view, and may be disposed to be asymmetrical to the extension direction of the first input-side signal electrode 355 in a plan view. In addition, the through-holes 12CP and the through-hole 13DP are disposed to be approximately symmetrical to the extension direction of the second input-side signal electrode 375 in a plan view, but may be disposed to be asymmetrical to the extension direction of the second input-side signal electrode 375 in a plan view.

In a case where two control signal electrodes are provided, a contribution ratio to the effect of suppressing the cross-talk is different between the through-holes 13CP and 13DP which are formed on an inter-signal-electrode ground electrode 413 side in comparison to the two control signal electrodes, and the through-holes 11CP and 12CP which are formed on a first ground electrode 411 side and on a second ground electrode 412 side in comparison to the two control signal electrodes. For convenience of design, so as to decrease a scale in characteristic analysis calculation, the through-holes 11CP and the through-holes 13CP may be disposed to be symmetrical to the extension direction of the first input-side signal electrode 355 in a plan view, and the through-holes 12CP and the through-holes 13DP may be disposed to be symmetrical to the extension direction of the second input-side signal electrode 375 in a plan view. The symmetrical disposition is also desirable when considering dispersion of stress and distortion in the substrate.

In addition, the main part 11M may have one or plural through-holes similar to the through-holes 11CP instead of the small-thickness part 11C. The main part 13M may have one or plural through-holes similar to the through-holes 13CP instead of the first small-thickness part 13C. The main part 13M may have one or plural through-holes similar to the through-holes 13DP instead of the second small-thickness part 13D. The main part 12M may have one or plural through-holes similar to the through-holes 12CP instead of the small-thickness part 12C.

According to the optical control device of this embodiment as described above, as is the case with the optical control devices 100 of the first to third embodiment, it is possible to suppress the cross-talk between the first input-side signal electrode 355 and the second input-side signal electrode 375 due to an effect of reducing spreading of the lines of electric force between the first input-side signal electrode 355 and the first ground electrode 411 and between the first input-side signal electrode 355 and the inter-signal-electrode ground electrode 413, and an effect of suppressing spreading of the lines of electric force between the second input-side signal electrode 375 and the second ground electrode 412, and between the second input-side signal electrode 375 and the inter-signal-electrode ground electrode 413.

In the optical control device according to this embodiment as described above, the inter-signal-electrode ground electrode 413, the first ground electrode 411, and the second ground electrode 412 have through-holes, respectively. According to this, the surface area of the inter-signal-electrode ground electrode 413, the first ground electrode 411, and the second ground electrode 412 increases, and thus the lines of electric force which are radiated from the first input-side signal electrode are likely to terminate at the inter-signal-electrode ground electrode 413 and the first ground electrode 411, and the lines of electric force which are radiated from the second input-side signal electrode are likely to terminate at the inter-signal-electrode ground electrode 413 and the second ground electrode 412. As a result, it is possible to further suppress the cross-talk between the first input-side signal electrode and the second input-side signal electrode.

In the fourth embodiment, means for forming a multi-step in the first input-side signal electrode and the second input-side signal electrode, which is used in combination of the formation of grooves, is a countermeasure effective for a reduction of the cross-talk even when being used alone. The second embodiment and the third embodiment obtain the effect of reducing spreading of the lines of electric force between the first input-side signal electrode and the first ground electrode and between the first input-side signal electrode and the inter-signal-electrode ground electrode, and spreading of the lines of electric force between the second input-side signal electrode and the second ground electrode, and the second input-side signal electrode and the inter-signal-electrode ground electrode by increasing the surface area of each electrode which faces an adjacent electrode. In contrast, in the fourth embodiment, there is a greater effect of suppressing spreading of the lines of electric force between the first input-side signal electrode and the first ground electrode and between the first input-side signal electrode and the inter-signal-electrode ground electrode, and spreading of the lines of electric force between the second input-side signal electrode and the second ground electrode and between the second input-side signal electrode and the inter-signal-electrode ground electrode due to a so-called edge effect.

An effect on the characteristic impedance depends on the thickness of the small-thickness part 11C, the first small-thickness part 13C, the small-thickness part 12C, and the second small-thickness part 13D, the size and the number of the through-holes 11CP, 12CP, 13CP, and 13DP which are formed, and the like. In accordance with design, it is possible to compensate for a decrease in the characteristic impedance due to introduction of the small-thickness part 11C, the first small-thickness part 13C, the small-thickness part 12C, and the second small-thickness part 13D. According to the optical control device of the fourth embodiment in which these are used in combination, it is possible to simultaneously attain improvement in a reduction of the cross-talk and improvement in the degree of freedom of design, and thus a very high synergistic effect is exhibited. In addition, in this embodiment, four kinds of through-holes are present (that is, the through-holes 11CP, the through-holes 13CP, the through-holes 13DP, and the through-holes 12CP are present) in the small-thickness part, but in this embodiment, at least one kind among the four kinds of through-holes may be present, or plural through-holes may be selectively present.

Fifth Embodiment

Figure 11:
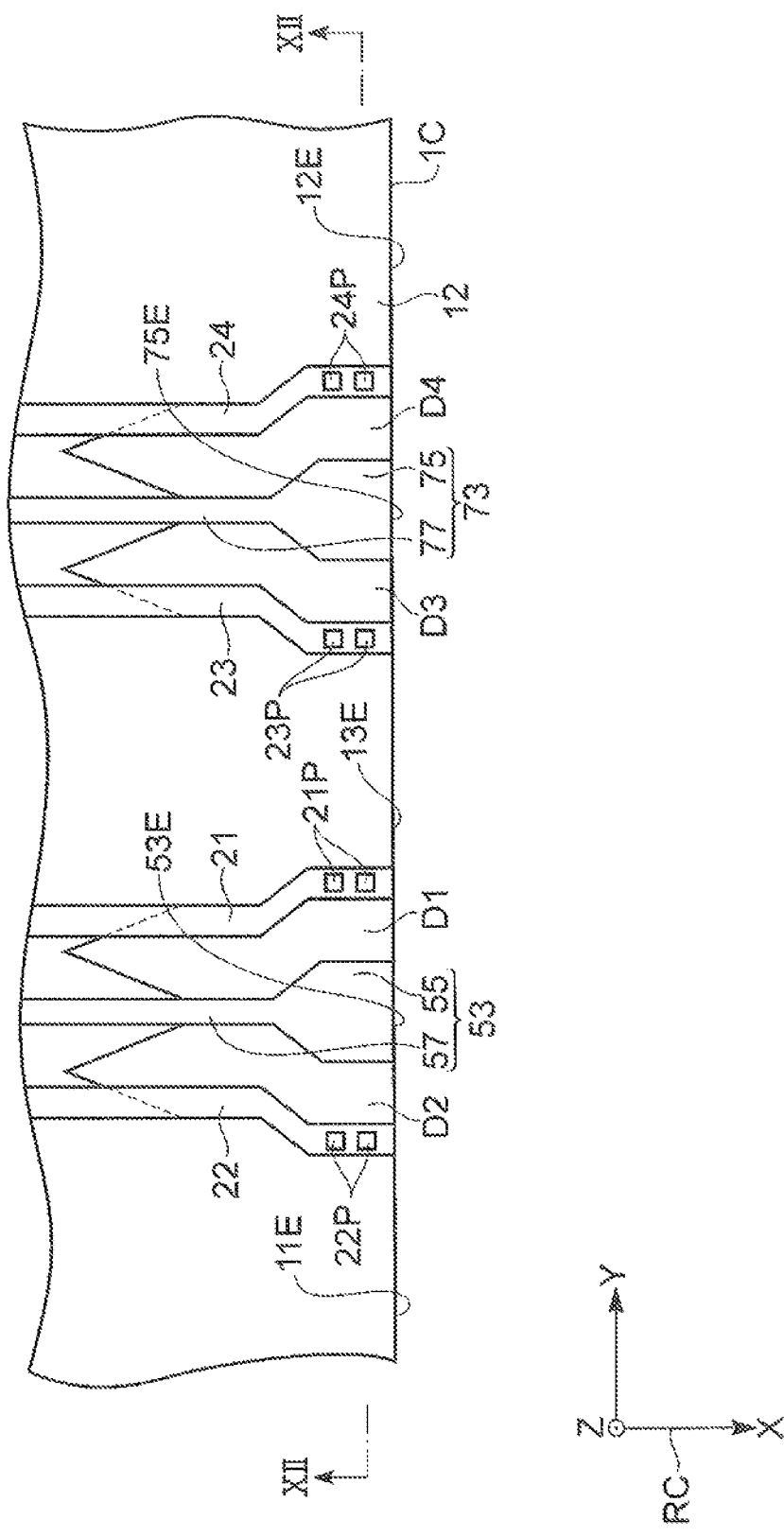
FIG. 11 is a plan view illustrating the configuration of a first input-side signal electrode of a first control signal electrode and a first input-side signal electrode of a second control signal electrode according to a fifth embodiment in the vicinity of ends on one side.

Next, a fifth embodiment of the invention will be described. FIG. 11 is a plan view illustrating the configuration of a first input-side signal electrode of a first control signal electrode and a first input-side signal electrode of a second control signal electrode according to a fifth embodiment in the vicinity of ends on one side, and FIG. 12 is an end view of an optical control device which is taken along line XII-XII in FIG. 11.

The optical control device of the fifth embodiment is different from the optical control device of the first embodiment in that the optical control device of the fifth embodiment further includes an in-first-groove ground electrode 21 that is provided in the first groove D1, an in-second-groove ground electrode 22 that is provided in the second groove D2, an in-third-groove ground electrode 23 that is provided in the third groove D3, and an in-fourth-groove ground electrode 24 that is provided in the fourth groove D4.

The in-first-groove ground electrode 21 is electrically connected to the inter-signal-electrode ground electrode 13 through a side surface of the first groove D1, the in-second-groove ground electrode 22 is electrically connected to the first ground electrode 11 through a side surface of the second groove D2, the in-third-groove ground electrode 23 is electrically connected to the inter-signal-electrode ground electrode 13 through a side surface of the third groove D3, and the in-fourth-groove ground electrode 24 is electrically connected to the second ground electrode 12 through a side surface of the fourth groove D4.

The in-first-groove ground electrode 21, the in-second-groove ground electrode 22, the in-third-groove ground electrode 23, and the in-fourth-groove ground electrode 24 may have a thickness smaller than the depth of the first groove D1, the second groove D2, the third groove D3, and the fourth groove D4, respectively.

Each of the in-first-groove ground electrode 21 and the in-second-groove ground electrode 22 is separated from the first input-side signal electrode 53. In a plan view, the in-first-groove ground electrode 21 and the in-second-groove ground electrode 22 may extend in the first groove D1 and the second groove D2 along a part of the first input-side signal electrode 53, may extend in the first groove D1 and the second groove D2 along the entirety of the first input-side signal electrode 53, or may extend in the first groove D1 and the second groove D2 along a part or the entirety of the first control signal electrode 5.

Similarly, each of the in-third-groove ground electrode 23 and the in-fourth-groove ground electrode 24 is separated from the second input-side signal electrode 73. In a plan view, the in-third-groove ground electrode 23 and the in-fourth-groove ground electrode 24 may extend in the third groove D3 and the fourth groove D4 along a part of the second input-side signal electrode 73, may extend in the third groove D3 and the fourth groove D4 along the entirety of the second input-side signal electrode 73, or may extend in the third groove D3 and the fourth groove D4 along a part or the entirety of the second control signal electrode 7.

In addition, the in-first-groove ground electrode 21 has plural through-holes 21P. The in-second-groove ground electrode 22 has plural through-holes 22P. The in-third-groove ground electrode 23 has plural through-holes 232. The in-fourth-groove ground electrode 24 has plural through-holes 24P. The through-holes 21P, the through-holes 22P, the through-holes 23P, and the through-holes 24P are holes which penetrate through the in-first-groove ground electrode 21, the in-second-groove ground electrode 22, the in-third-groove ground electrode 23, and the in-fourth-groove ground electrode 24 in a thickness direction thereof, respectively. In addition, the in-first-groove ground electrode 21, the in-second-groove ground electrode 22, the in-third-groove ground electrode 23, and the in-fourth-groove ground electrode 24 may have only one of the through-holes 21P, only one of the through-holes 22P, only one of the through-holes 23P, and only one of the through-holes 24P, respectively, or may not have the through-hole.

The shape of the through-holes 21P, the through-holes 22P, the through-holes 23P, and the through-holes 242 in a plan view is, for example, a rectangular shape, but may be other shapes such as a circular shape and an elliptical shape. The things to keep in mind in design with respect to the shape, dispositional position, periodicity, symmetry, and the like of the through-holes are the same as in the case of the fourth embodiment.

According to the optical control device of this embodiment as described above, as is the case with the optical control devices 100 of the first to fourth embodiments, it is possible to suppress the cross-talk between the first input-side signal electrode 53 and the second input-side signal electrode 73 due to an effect of reducing spreading of the lines of electric force between the first input-side signal electrode 53 and the first ground electrode 11 and between the first input-side signal electrode 53 and the inter-signal-electrode ground electrode 13, and an effect of reducing spreading of the lines of electric force between the second input-side signal electrode 73 and the second ground electrode 12 and between the second input-side signal electrode 73 and the inter-signal-electrode ground electrode 13.

In addition, according to the optical control device of this embodiment as described above, the in-first-groove ground electrode 21, the in-second-groove ground electrode 22, the in-third-groove ground electrode 23, and the in-fourth-groove ground electrode 24 are provided. Accordingly, a part of the lines of electric force which are radiated from the first input-side signal electrode 53 terminates at the in-first-groove ground electrode 21 and the in-second-groove ground electrode 22, and a part of the lines of electric force which are radiated from the second input-side signal electrode 73 terminates at the in-third-groove ground electrode 23 and the in-fourth-groove ground electrode 24. As a result, the lines of electric force which are radiated from the first input-side signal electrode 53, and the lines of electric force which are radiated from the second input-side signal electrode 73 are likely to terminate at a nearer position, and thus it is possible to further suppress the cross-talk between the first input-side signal electrode 53 and the second input-side signal electrode 73.

In addition, according to the optical control device of this embodiment as described above, the in-first-groove ground electrode 21, the in-second-groove ground electrode 22, the in-third-groove ground electrode 23, and the in-fourth-groove ground electrode 24 have through-holes (the through-holes 21P, 22P, 23P, and 24P), respectively. According to this, an edge effect at the in-first-groove ground electrode 21, the in-second-groove ground electrode 22, the in-third-groove ground electrode 23, and the in-fourth-groove ground electrode 24 increases. Accordingly, the lines of electric force which are radiated from the first input-side signal electrode 53 are more likely to terminate at the in-first-groove ground electrode 21 and the in-second-groove ground electrode 22, and the lines of electric force which are radiated from the second input-side signal electrode 73 are more likely to terminate at the in-third-groove ground electrode 23 and the in-fourth-groove ground electrode 24. As a result, it is possible to further suppress the cross-talk between the first input-side signal electrode 53 and the second input-side signal electrode 73. The effect and the things to keep in mind in design are the same as in the case of the fourth embodiment.

In addition, in a case where the in-first-groove ground electrode 21, the in-second-groove ground electrode 22, the in-third-groove ground electrode 23, and the in-fourth-groove ground electrode 24 are disposed in the first groove D1, the second groove D2, the third groove D3, and the fourth groove D4, manufacturing difficulty slightly increases, but the width of the first groove D1, the second groove D2, the third groove D3, and the fourth groove D4 is released from the restriction in the relationship between the spaced distances K1 and K2. Accordingly, according to this embodiment, the degree of freedom in a structure design and a characteristic design are significantly improved in comparison to the case of the fourth embodiment. In addition, in this embodiment, four kinds of through-holes are present (that is, the through-holes 22P, the through-holes 21P, the through-holes 23P, and the through-holes 24P are present) in the in-groove ground electrodes. However, in this embodiment, only at least one kind among the four kinds of through-holes may be present, or the through-holes may not be present. In this embodiment, the four in-groove ground electrodes, that is, the in-first-groove ground electrode 21, the in-second-groove ground electrode 22, the in-third-groove ground electrode 23, and the in-fourth-groove ground electrode 24 are present. However, in this embodiment, only at least one among the four in-groove ground electrodes may be present, or plural in-groove ground electrodes may be selectively present.

Sixth Embodiment

Figure 13:
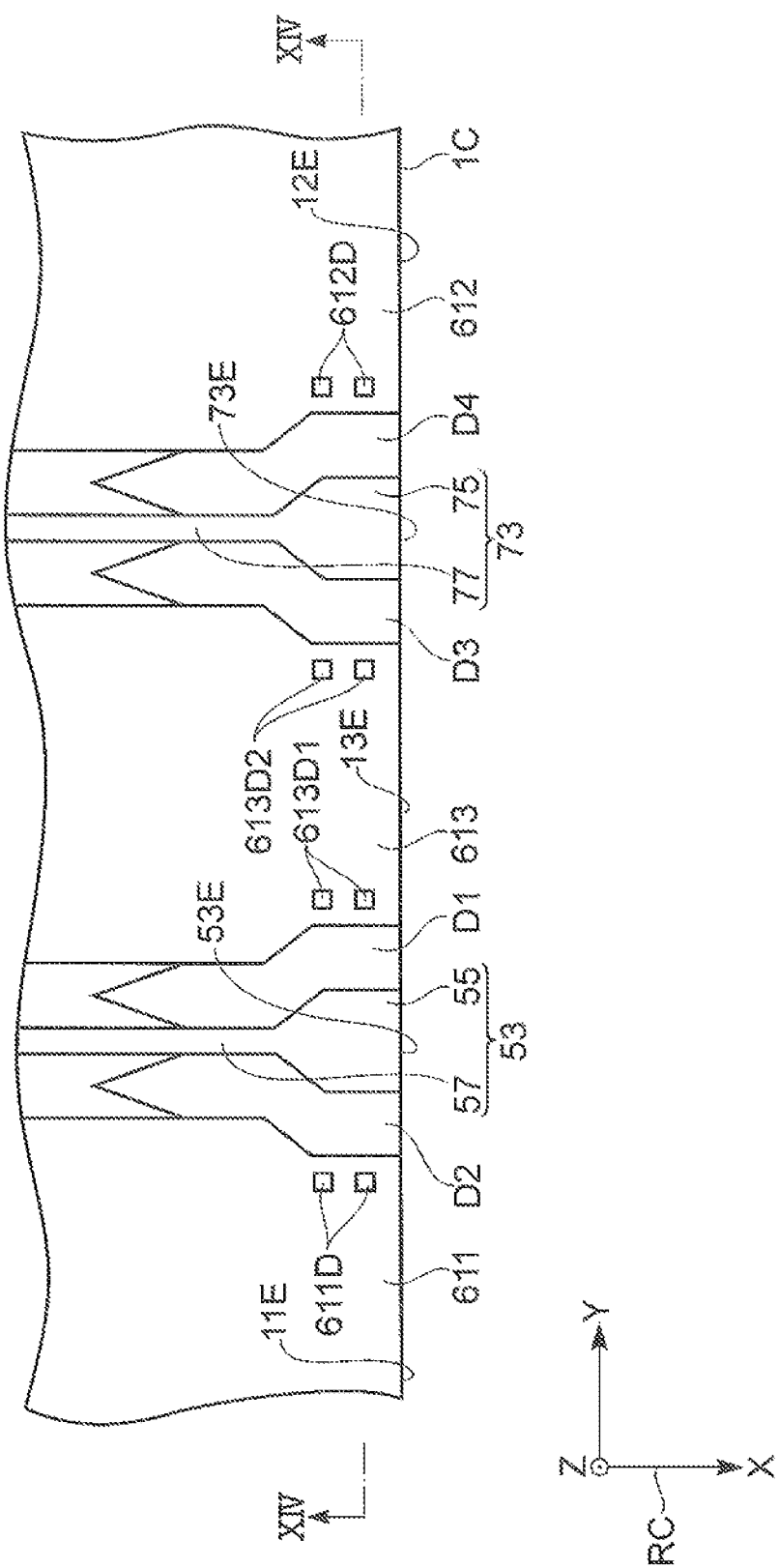
FIG. 13 is a plan view illustrating the configuration of a first input-side signal electrode of a first control signal electrode, and a first input-side signal electrode of a second control signal electrode according to a sixth embodiment in the vicinity of ends on one side.
Figure 14:
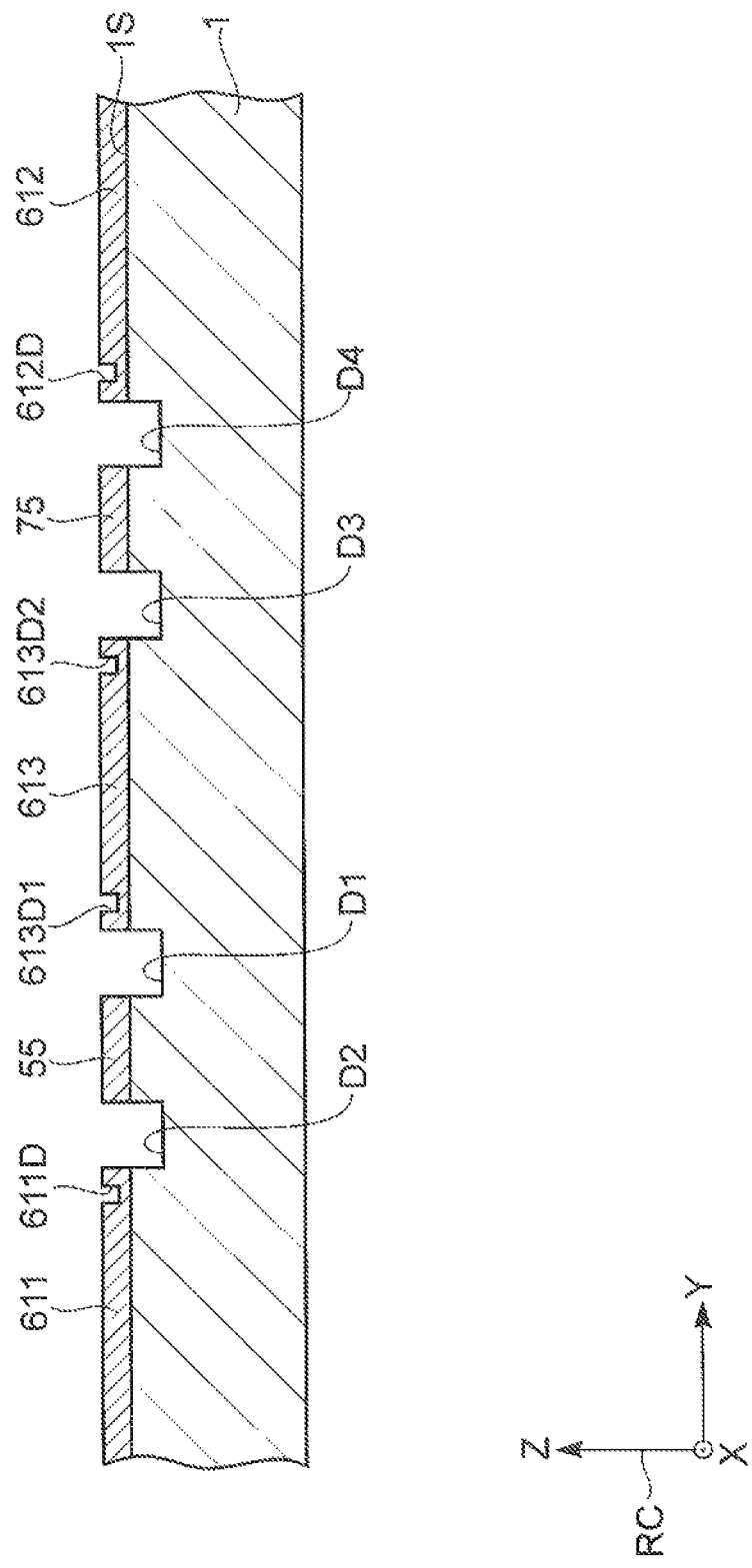
FIG. 14 is an end view of an optical control device which is taken along line XIV-XIV in FIG. 13.

Next, a sixth embodiment of the invention will be described. FIG. 13 is a plan view illustrating the configuration of a first input-side signal electrode of a first control signal electrode, and a first input-side signal electrode of a second control signal electrode according to a sixth embodiment in the vicinity of ends on one side, and FIG. 14 is an end view of an optical control device which is taken along line XIV-XIV in FIG. 13.

The optical control device of the sixth embodiment is different from the optical control device of the first embodiment in the configuration of the first ground electrode, the second ground electrode, and the inter-signal-electrode ground electrode.

Specifically, a first ground electrode 611 of this embodiment is different from the first ground electrode 11 (refer to FIG. 2 to FIG. 4) of the first embodiment in that the first ground electrode 611 has plural concave portions 611D. A second ground electrode 612 of this embodiment is different from the second ground electrode 12 (refer to FIG. 2 to FIG. 4) of the first embodiment in that the second ground electrode 612 has plural concave portions 612D. An inter-signal-electrode ground electrode 613 of this embodiment is different from the inter-signal-electrode ground electrode 13 (refer to FIG. 2 to FIG. 4) of the first embodiment in that the inter-signal-electrode ground electrode 613 has plural concave portions 613D1 and plural concave portions 613D2.

The respective concave portions 611D do not penetrate through the first ground electrode 611 in a thickness direction thereof, and are sequentially provided along a side surface of the first ground electrode 611 on a first input-side signal electrode 53 side in a plan view. The respective concave portions 612D do not penetrate through the second ground electrode 612 in a thickness direction thereof, and are sequentially provided along a side surface of the second ground electrode 612 on a second input-side signal electrode 73 side in a plan view. The respective concave portions 613D1 do not penetrate through the inter-signal-electrode ground electrode 613 in a thickness direction thereof, and are sequentially provided along a side surface of the inter-signal-electrode ground electrode 613 on a first input-side signal electrode 53 side in a plan view. The respective concave portions 613D2 do not penetrate through the inter-signal-electrode ground electrode 613 in a thickness direction thereof, and are sequentially provided along a side surface of the inter-signal-electrode ground electrode 613 on a second input-side signal electrode 73 side in a plan view.

In addition, the first ground electrode 611 may have only one of the concave portions 611D. The second ground electrode 612 may have only one of the concave portions 612D. The inter-signal-electrode ground electrode 613 may have only one of the concave portions 613D1. The inter-signal-electrode ground electrode 613 may have only one of the concave portions 613D2.

The shape of the respective concave portions 611D, the concave portions 612D, the concave portions 613D1, and the concave portions 613D2 in a plan view is, for example, a rectangular shape, but may be other shapes such as a circular shape and an elliptical shape. The things to keep in mind in design with respect to the shape, disposition, and periodicity of the concave portions 611D, 612D, 613D1, and 613D2 are the same as in the case of the through-holes 11CP, 12CP, 13CP, and 13DP (refer to FIG. 9 and FIG. 10) in the fourth embodiment.

According to the optical control device of this embodiment as described above, as is the case with the optical control devices 100 of the first to fifth embodiments, it is possible to suppress the cross-talk between the first input-side signal electrode 53 and the second input-side signal electrode 73 due to an effect of reducing spreading of the lines of electric force between the first input-side signal electrode 53 and the first ground electrode 611 and between the first input-side signal electrode 53 and the inter-signal-electrode ground electrode 613, and an effect of reducing spreading of the lines of electric force between the second input-side signal electrode 73 and the second ground electrode 612 and between the second input-side signal electrode 73 and the inter-signal-electrode ground electrode 613.

In the optical control device of this embodiment as described above, the inter-signal-electrode ground electrode 613, the first ground electrode 611, and the second ground electrode 612 have the concave portions (the concave portions 611D, 612D, 613D1, 613D2). According to this, the surface area of the inter-signal-electrode ground electrode 613, the first ground electrode 611, and the second ground electrode 612 increases. Accordingly, the lines of electric force which are radiated from the first input-side signal electrode 53 are likely to terminate at the inter-signal-electrode ground electrode 613 and the first ground electrode 611, and the lines of electric force which are radiated from the second input-side signal electrode 73 are likely to terminate at the inter-signal-electrode ground electrode 613 and the second ground electrode 612. As a result, it is possible to further suppress the cross-talk between the first input-side signal electrode 53 and the second input-side signal electrode 73.

In the sixth embodiment, a method of forming the concave portions (electrode the concave portions 611D, 612D, 613D1, 613D2) in the inter-signal-electrode ground electrode 613, the first ground electrode 611, and the second ground electrode 612 in combination with the formation of grooves in the substrate is a countermeasure effective for a reduction of the cross-talk even when being used alone. However, as is the case with the second embodiment and the third embodiment, the method is a method of increasing the surface area of the inter-signal-electrode ground electrode 613, the first ground electrode 611, and the second ground electrode 612, and is substantially accompanied with a decrease in characteristic impedance. Accordingly, the formation of the grooves in the substrate, which has a high effect as means for increasing the characteristic impedance, is particularly effective. According to the optical control device of the sixth embodiment, it is possible to attain improvement in a reduction of the cross-talk and improvement in the degree of freedom of design, and thus a high synergistic effect is exhibited.

In this embodiment, the concave portions 611D and the concave portions 613D1 are disposed to be approximately symmetrical to the extension direction of the first input-side signal electrode 53 in a plan view, but these may be disposed to be asymmetrical to the extension direction of the first input-side signal electrode 53. In addition, the concave portions 613D2 and the concave portions 612D are disposed to be approximately symmetrical to the extension direction of the second input-side signal electrode 73 in a plan view, but these may be disposed to be asymmetrical to the extension direction of the second input-side signal electrode 73.

In a case where two control signal electrodes are provided, a contribution ratio to the effect of suppressing the cross-talk is different between the concave portions 613D1 and 613D2 which are formed on an inter-signal-electrode ground electrode 613 side, and the concave portions 611D and 612D which are formed on a first ground electrode 611 side and a second ground electrode 612 side. For convenience of design, so as to decrease a scale in characteristic analysis calculation, the concave portions 611D and 613D1 may be disposed to be symmetrical to the extension direction of the first input-side signal electrode 53 in a plan view, and the concave portions 613D2 and the concave portion 612D may be disposed to be symmetrical to the extension direction of the second input-side signal electrode 73 in a plan view. The symmetrical disposition is also desirable when considering dispersion of stress and distortion in the substrate. In addition, in this embodiment, four kinds of concave portions are present (that is, the concave portions 611D, the concave portions 612D, the concave portions 613D1, and the concave portions 613D2 are present) in the ground electrodes. In this embodiment, at least one kind among the four kinds of concave portions may be present, or plural concave portions may be selectively present.

The invention is not limited to the above-described embodiments, and various modification aspects are possible.

For example, in the optical control device 100 of the first embodiment, the first ground electrode 11 may have one or plural through-holes, which face the first input-side signal electrode 53, in a direction (Y-axis direction) perpendicular to the extension direction of the first input-side signal electrode 53 in a plan view as one or plural through-holes which correspond to the through-holes 11CP of the fourth embodiment. In addition, in the optical control device 100 of the first embodiment, the second ground electrode 12 may have one or plural through-holes, which face the second input-side signal electrode 73, in a direction (Y-axis direction) perpendicular to the extension direction of the second input-side signal electrode 73 in a plan view as through-holes which correspond to the through-holes 12CP of the fourth embodiment.

In addition, in the optical control device 100 of the first embodiment, the inter-signal-electrode ground electrode 13 may have one or plural through-holes, which face the first input-side signal electrode 53, in a direction (Y-axis direction) perpendicular to the extension direction of the first input-side signal electrode 53 in a plan view as one or plural through-holes which correspond to the through-holes 13CP of the fourth embodiment. In addition, the inter-signal-electrode ground electrode 13 may have one or plural through-holes, which face the second input-side signal electrode 73, in a direction (Y-axis direction) perpendicular to the extension direction of the second input-side signal electrode 73 in a plan view as one or plural through-holes which correspond to the through-holes 13DP of the fourth embodiment.

In addition, in the optical control devices of the respective embodiments as described above, the substrate 1 may have a groove, which is provided in a region between the first arm optical waveguide 31 and the second arm optical waveguide 32 in a plan view in the main surface 1S of the substrate 1, along the extension direction of the first arm optical waveguide 31 and the second arm optical waveguide 32.

In addition, the optical control devices 100 of the respective embodiments as described above include the Mach-Zehnder type optical waveguide as the optical waveguide structure 3. However, the invention relates to a technology of reducing the cross-talk between the first input-side signal electrode 53 and the second input-side signal electrode 73, and it should be understood that the invention is also applicable to an optical control device including a different kind of optical waveguide structure. For example, it is needless to say that the invention is applicable to an optical control device including an optical waveguide structure that is constituted by plural linear waveguides, a cross waveguide, a multi-branched waveguide, a ring type waveguide resonator, and the like.

The optical control devices in the respective embodiments as described above include two control signal electrodes. However, it is needless to say that the invention is applicable to an optical control device including three or more control signal electrodes.

In the respective embodiments as described above, description has been given of a method of suppressing the cross-talk between the respective input-side signal electrodes of the respective modulation electrodes, but the suppression method is also effective for suppression of cross-talk between the respective operating parts of the respective modulation electrodes, and cross-talk between respective output-side signal electrodes which range from operating electrodes of the respective modulation electrodes to a terminator resistor.

In addition, in the respective embodiments as described above, description has been made with focus particularly given to a method of suppressing the cross-talk at the input pad part. However, the suppression method may be introduced to the entirety of the first control signal electrode 5 and the second control signal electrode 7, may be introduced to the entirety of the first input-side signal electrode 53 and the second input-side signal electrode 73, may be introduced only to the input pad 55 and the input pad 75, or may be introduced to the first input-side signal electrode 53 and the second input-side signal electrode 73 except for the input pad 55 and the input pad 75. An introduction method may not have the same configuration in each case, and a configuration, which is easy to design and is easy to manufacture, may be appropriately selected.

A length ratio of the input pad 55 and the input pad 75, which occupy the entirety of the first control signal electrode 5 and the second control signal electrode 7, is small. However, the spaced distance between the first ground electrode and the inter-signal-electrode ground electrode, and the spaced distance between the second ground electrode and the inter-signal-electrode ground electrode in the vicinity of the input pad 55 and the input pad 75 are large, and thus the cross-talk is likely to occur, particularly, between the input pad 55 and the input pad 75. Accordingly, it is effective to apply the suppression method to the input pad 55 and the input pad 75. In an integrated device including plural control signal electrodes, the respective input-side signal electrode parts are longer than the respective input pads, and include a structure changing part such as a bent part, a meandering part, a signal electrode width changing part, and a signal electrode-ground electrode distance changing part, in which the cross-talk is likely to occur, in many cases. Therefore, it is effective to apply the suppression method to the respective input-side signal electrode parts. Parts to which the suppression method is applied, and a method of applying the suppression method may be suitably selected in accordance with necessary cross-talk characteristics.

An effect of application of the suppression method to the output-side signal electrode part will be briefly described. In a case of an optical control device of a wide band propagating wave electrode type, generally, a control signal is terminated by a terminator resistor after being transmitted to the output-side signal electrode part, and does not operate on light. Accordingly, even when the suppression method is applied to the output-side signal electrode part, there is no improvement in important characteristics of modulated output light. However, when evaluating propagation characteristics (S21) and the like of the control signal electrode by a network analyzer during manufacturing of the optical control device, if the suppression method has been applied, it is possible to suppress undervaluation of the propagation characteristics due to the cross-talk between the respective output-side signal electrode parts. On the other hand, in an optical control device having a configuration in which a control signal is reflected without complete termination to be applied again to light, the output-side signal electrode part also functions as an input-side signal electrode part, and thus it is needless to say that application of the suppression method to the output-side signal electrode part is effective for improvement in characteristics of an optical output signal.

In addition, in the respective embodiments as described above, description has been made without limitation to the thickness of the substrate 1, but the effect of suppressing the cross-talk between the respective input-side signal electrodes according to the invention is effectively exhibited even when using the substrate 1 having an arbitrary thickness. The above-described effect of the invention is effectively exhibited even in a case of using a substrate having a thickness of 0.4 mm to 1.00 mm which is typically used for manufacturing of a lithium niobate optical modulator. In addition, the above-described effect is effectively exhibited even in a case of using a substrate having a thickness of 30 μm to 100 μm similar to the case of the invention described in Patent Literature No. 2.

REFERENCE SIGNS LIST

1: Substrate
1S: Main surface of substrate
3: Optical waveguide structure
31: First arm optical waveguide (first optical waveguide)
32: Second arm optical waveguide (second optical waveguide)
5: First control signal electrode
7: Second control signal electrode
11: First ground electrode
12: Second ground electrode
13: Inter-signal-electrode ground electrode
53: First input-side signal electrode
73: Second input-side signal electrode
D1: First groove
D2: Second groove D3: Third groove
D4: Fourth groove

The invention claimed is:

1. An optical control device, comprising:
a substrate;
first and second optical waveguides provided on the substrate, and extending along a main surface of the substrate;
a first control signal electrode provided on the main surface of the substrate so as to change a refractive index of light propagating through the inside of the first optical waveguide on the basis of a first electrical signal supplied from an outer side, the first control signal electrode including a first operating electrode part extending along the first optical waveguide to apply an electrical field to the first optical waveguide, and a first input-side signal electrode extending along the main surface of the substrate to transmit the first electrical signal to the first operating electrode part;
a second control signal electrode provided on the main surface of the substrate so as to change a refractive index of light propagating through the inside of the second optical waveguide on the basis of a second electrical signal supplied from an outer side, the second control signal electrode including a second operating electrode part extending along the second optical waveguide to apply an electrical field to the second optical waveguide, and a second input-side signal electrode extending along the main surface of the substrate to transmit the second electrical signal to the second operating electrode part;
an inter-signal-electrode ground electrode provided on the main surface of the substrate between the first input-side signal electrode and the second input-side signal electrode, the inter-signal-electrode ground electrode being positioned to be spaced away from the first input-side signal electrode and the second input-side signal electrode in a plan view;
a first ground electrode provided on the main surface of the substrate on a side opposite to an inter-signal-electrode ground electrode side with the first input-side signal electrode interposed between the first ground electrode and the inter-signal-electrode ground electrode, the first ground electrode being positioned to be spaced away from the first input-side signal electrode in a plan view; and
a second ground electrode provided on the main surface of the substrate on a side opposite to an inter-signal-electrode ground electrode side with the second input-side signal electrode interposed between the second ground electrode and the inter-signal-electrode ground electrode, the second ground electrode being positioned to be spaced away from the second input-side signal electrode in a plan view,
wherein, in a plan view, the substrate includes a first groove provided between the first input-side signal electrode and the inter-signal-electrode ground electrode, a second groove provided between the first input-side signal electrode and the first ground electrode, a third groove provided between the second input-side signal electrode and the inter-signal-electrode ground electrode, and a fourth groove provided between the second input-side signal electrode and the second ground electrode,
one end of the first ground electrode, one end of the first input-side signal electrode, one end of the inter-signal-electrode ground electrode, one end of the second input-side signal electrode, and one end of the second ground electrode are arranged along a first direction along the main surface of the substrate in this order, and
when a spaced distance between the one end of the first input-side signal electrode and the one end of the second input-side signal electrode along the first direction is set as D, and a spaced distance between the one end of the first ground electrode and the one end of the inter-signal-electrode ground electrode along the first direction or a spaced distance between the one end of the second ground electrode and the one end of the inter-signal-electrode ground electrode along the first direction is set as K, a value of D/K is 3.0 or less.

2. The optical control device according to claim 1, wherein the depth of the first groove, the second groove, the third groove, and the fourth groove is 2 μm or more.

3. The optical control device according to claim 1, wherein the inter-signal-electrode ground electrode includes a main part, and a first small-thickness part provided on a first groove side in comparison to the main part and being thinner than the main part and/or a second small-thickness part provided on a third groove side in comparison to the main part and being thinner than the main part, and/or
wherein the first ground electrode includes a main part, and a small-thickness part provided on a second groove side in comparison to the main part and being thinner than the main part, and/or
wherein the second ground electrode includes a main part, and a small-thickness part provided on a fourth groove side in comparison to the main part and being thinner than the main part.

4. The optical control device according to claim 1, wherein the first control signal electrode includes a main part, and a first small-thickness part provided on a first groove side in comparison to the main part and being thinner than the main part, and/or a second small-thickness part provided on a second groove side in comparison to the main part and being thinner than the main part, and/or
wherein the second control signal electrode includes a main part, and a first small-thickness part provided on a third groove side in comparison to the main part and being thinner than the main part and/or a second small-thickness part provided on a fourth groove side in comparison to the main part and being thinner than the main part.

5. The optical control device according to claim 1, wherein at least one of the inter-signal-electrode ground electrode, the first ground electrode, and the second ground electrode has a through-hole.

6. The optical control device according to claim 1, further comprising:
an in-first-groove ground electrode provided in the first groove and being electrically connected to the inter-signal-electrode ground electrode, and/or an in-second-groove ground electrode provided in the second groove and being electrically connected to the first ground electrode, and/or an in-third-groove ground electrode provided in the third groove and being electrically connected to the inter-signal-electrode ground electrode, and/or an in-fourth-groove ground electrode provided in the fourth groove and being electrically connected to the second ground electrode.

7. The optical control device according to claim 6, wherein at least one of the in-first-groove ground electrode, the in-second-groove ground electrode, the inthird-groove ground electrode, and the in-fourth-groove ground electrode has a through-hole.

8. The optical control device according to claim 1, wherein at least one of the inter-signal-electrode ground electrode, the first ground electrode, and the second ground electrode has a concave portion.

* * * * *